United States Patent
Ueda et al.

(10) Patent No.: US 9,014,240 B2
(45) Date of Patent: Apr. 21, 2015

(54) WIRELESS TRANSMITTER/RECEIVER, WIRELESS COMMUNICATION DEVICE, AND WIRELESS COMMUNICATION SYSTEM

(75) Inventors: Shinsuke Ueda, Osaka (JP); Masahiro Nagata, Osaka (JP); Kazuhisa Yoshiki, Hyogo (JP); Masanori Kurita, Osaka (JP); Junichi Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 50 days.

(21) Appl. No.: 13/580,590

(22) PCT Filed: Feb. 22, 2011

(86) PCT No.: PCT/IB2011/000339
§ 371 (c)(1), (2), (4) Date: Aug. 22, 2012

(87) PCT Pub. No.: WO2011/104603
PCT Pub. Date: Sep. 1, 2011

(65) Prior Publication Data
US 2012/0320955 A1    Dec. 20, 2012

(30) Foreign Application Priority Data

Feb. 23, 2010  (JP) ................... 2010-037815
May 26, 2010  (JP) ................... 2010-120932
Jun. 4, 2010  (JP) ................... 2010-129195

(51) Int. Cl.
H04B 1/44        (2006.01)
H04W 52/02       (2009.01)

(52) U.S. Cl.
CPC ............ *H04W 52/0274* (2013.01); *Y02B 60/50* (2013.01)

(58) Field of Classification Search
CPC ............. H04B 7/00; H04M 1/00; H04M 1/04
USPC .......................... 375/219, 239, 278
See application file for complete search history.

(56) References Cited

U.S. PATENT DOCUMENTS 6,034,990 A * 3/2000 Kang ...................... 375/219
6,434,187 B1 * 8/2002 Beard et al. .................. 375/219

(Continued)

FOREIGN PATENT DOCUMENTS

JP    S57-103436    6/1982
JP    H6-6258       1/1994

(Continued)

OTHER PUBLICATIONS

International Search Report for corresponding International Application No. PCT/IB2011/000339 mailed Jul. 5, 2012.

(Continued)

*Primary Examiner* — Jaison Joseph
(74) *Attorney, Agent, or Firm* — Renner, Otto, Boisselle & Sklar, LLP.

(57) ABSTRACT

Disclosed is a wireless transmitter/receiver provided with: a local oscillator which oscillates at a predetermined local oscillator frequency; a mixer which mixes a local oscillation signal of the local oscillation frequency outputted from an output terminal of the local oscillator and a radio signal received by an antenna; a modulation circuit which modulates the local oscillator signal and generates a radio signal; and a transmission/reception switching unit which selectively switches over between a reception state in which the output terminal of the local oscillator is connected to the mixer and a transmission state in which the output terminal is connected to the antenna without passing through the mixer.

17 Claims, 17 Drawing Sheets

(56) References Cited

U.S. PATENT DOCUMENTS

| | | | |
|---|---|---|---|
| 6,625,424 B1* | 9/2003 | Mohindra | 455/84 |
| 6,766,148 B1* | 7/2004 | Mohindra | 455/73 |
| 7,627,289 B2* | 12/2009 | Huddart | 455/41.2 |
| 8,014,832 B1* | 9/2011 | Garrabrant et al. | 455/574 |
| 2007/0149261 A1* | 6/2007 | Huddart | 455/575.2 |
| 2009/0092119 A1* | 4/2009 | Rengert | 370/345 |
| 2010/0015938 A1 | 1/2010 | Fujikawa | |
| 2013/0064151 A1* | 3/2013 | Mujtaba et al. | 370/311 |

FOREIGN PATENT DOCUMENTS

| | | |
|---|---|---|
| JP | H8-288896 | 11/1996 |
| JP | 2001-119317 | 4/2001 |
| JP | 2006-237931 | 9/2006 |
| JP | 2007-300475 | 11/2007 |
| JP | 2008-176515 | 7/2008 |
| JP | 2009-105487 | 5/2009 |
| JP | 2009-111652 | 5/2009 |
| JP | 2009-290826 | 12/2009 |
| JP | 2010-28331 | 2/2010 |

OTHER PUBLICATIONS

Form PCT/ISA for corresponding International Application No. PCT/IB2011/000339 dated Jul. 5, 2012.

Japanese Office Action dated Apr. 15, 2014 and English summary thereof for corresponding Japanese Application No. 2010-120932.

* cited by examiner

WIRELESS TRANSMITTER/RECEIVER, WIRELESS COMMUNICATION DEVICE, AND WIRELESS COMMUNICATION SYSTEM

FIELD OF THE INVENTION

The present invention relates to a wireless communication device and system for transmitting and receiving a radio signal between multiple wireless communications stations, and a wireless transceiver used therefor.

BACKGROUND OF THE INVENTION

Conventionally, there have been disclosed various types of wireless transceivers employing a superheterodyne scheme that converts a radio frequency signal into a relatively low frequency signal (intermediate frequency signal), and amplifying and detecting the same. For example, a wireless receiver disclosed in Patent Document 1 includes a local oscillator which outputs a signal (i.e., a local oscillation signal) of a frequency (local oscillation frequency) that is an integer multiple of the frequency of an input signal (reference oscillation signal).

In the wireless receiver, a reception signal (RF signal) received by an antenna and the local oscillation signal outputted from the local oscillator are mixed by a mixer and converted into a signal having a frequency (intermediate frequency) lower than that of the RF signal. Further, various wireless transceivers using a phase locked loop (PLL) circuit as a local oscillator have also been provided.

As for a wireless communications station, there may be cases where characteristics (RF characteristics) of radio waves in use such as an occupied frequency bandwidth, an adjacent channel leakage power or the like should meet the rules of Radio Regulation Law. For example, in Japan Radio Regulation Law, a different standard (communication standards) is prescribed for each of usage purposes. In particular, a 'low power radio station' is prescribed as one of radio stations not requiring license in a provisory clause, article 4 of Japan Radio Regulation Law.

The 'low power radio station' includes a 'radio station for a cordless phone', a 'particular low power radio station', a 'low power security system', a 'radio station for a low power data communication system' and the like. Standards for radio facilities of each radio station are prescribed by facility regulation of enforcement regulations of the same Law.

As a wireless communication system including a particular low power radio station, for example, a fire warning system disclosed in Patent Document 2 was already proposed. This fire warning system includes multiple fire alarms as radio stations installed in multiple locations.

Each of the fire alarms includes a fire detection unit for detecting a fire, an alarm unit for generating an alarm sound, a wireless transmission/reception unit for transmitting and receiving fire notification information notifying about the occurrence of a fire through radio signals, and an operation controller (or a microcomputer) for controlling operations of the alarm unit and the wireless transmission/reception unit.

When a fire detection unit of a fire alarm detects the occurrence of a fire, an operation controller of the fire alarm outputs an alarm sound from an alarm unit and, simultaneously, a wireless transmission/reception unit thereof transmits fire notification information to other fire alarms. When wireless transmission/reception units of the other fire alarms receive the fire notification information from the fire alarm at the origin of fire, alarm units of the other fire alarms make an alarm sound loudly. Thus, when a fire alarm at a certain location detects the occurrence of a fire, alarm sounds are outputted from all multiple fire alarms including the fire alarm at the origin of fire, thereby quickly and reliably notifying about the occurrence of fire.

As the above, the fire alarm transmits the fire notification information through a radio signal and uses a battery as a power source. This eliminates a necessity of wiring and increases freedom of installation position. However, since a fire alarm is usually installed at a high location (e.g., the ceiling) where it is not easy to access in maintenance (e.g., battery replacement), preferably, the fire alarm can be used for a long period of time, e.g., for years, without maintenance and power consumption thereof is reduced to thereby lengthen a life span of the battery.

To this end, in each fire alarm, the operation controller including a microcomputer is switched into a sleep state consuming less power and a transmission/reception operation of the wireless transmission/reception unit is stopped, except for a case of detecting a fire and sounding an alarm, and wirelessly transmitting fire notification information. However, when the operation controller is in the sleep state except for the case of the fire detection, fire notification information wirelessly transmitted from another fire alarm cannot be received. For that reason, each fire alarm intermittently starts the operation controller in the sleep state to execute an operation of receiving a wireless signal.

Specifically, when a start signal is inputted to the operation controller from a timer, the operation controller checks whether or not it can receive a radio wave (i.e., fire notification information wirelessly transmitted from another fire alarm). That is, the operation controller controls the wireless transmission/reception unit to perform a receiving operation, and determines whether or not the strength of a reception signal received by the wireless transmission/reception unit exceeds a certain reference value.

When the reception signal strength does not exceed the reference value, the operation controller stops the transmission and reception operation of the wireless transmission/reception unit, sets an intermittent reception time period in the timer for next intermittent reception, starts counting, and transitions to the sleep state. On the other hand, when the reception signal strength exceeds the reference value, the operation controller continues the reception state of the wireless transmission/reception unit, analyzes the reception signal received by the wireless transmission/reception unit, and determines whether or not there is any communications to the fire alarm itself. When there is any communications to the fire alarm, the operation controller of the fire alarm executes corresponding processing.

Thus, the operation controller operates intermittently, and checks the signal strength of a radio wave received by the wireless transmission/reception unit. When the operation controller determines that the radio wave cannot be received, the operation controller stops the transmission and reception operation of the wireless transmission/reception unit, thereby reducing power consumption and lengthening a life span of a battery.

Meanwhile, a conventional wireless communication device is disclosed in Patent Document 3. As shown in FIG. 15, the wireless communication device includes an antenna 1000, an RF unit 1100, an interface unit 1200, and a microcomputer unit 1300. The RF unit 1100 includes a demodulation unit 111 for demodulating reception data (a demodulation signal) from a radio signal received via the antenna 1000 and a sampling clock generating unit 112 for generating a sampling clock from a synchronization bit stream of the demodulation signal.

The interface unit 1200 includes a frame code register 121 for storing a frame synchronization part (a unique word), a frame synchronization shift register 122 for sequentially storing the reception data demodulated by the demodulation unit 111 in synchronization with the sampling clock, a frame synchronization detection unit 123 for outputting a frame synchronization detection signal when bit streams of the frame code register 121 and the frame synchronization shift register 122 are identical, and a reception buffer 124 for storing the reception data in synchronization with the sampling clock when a frame synchronization is detected by the frame synchronization detection unit 123.

The microcomputer unit 1300 includes a RAM 131 for storing reception data, a controller 132 for decoding an original message from the reception data stored in the RAM 131, and a transmission unit 133 for transmitting the reception data stored in the reception buffer 124 to the RAM 131 by the number of times designated by the controller 132, and outputting a transmission completion signal to the controller 132 when the transmission of the reception data is completed.

Hereinafter, a reception operation of the conventional example will be described with reference to a time chart shown in FIG. 16. Also, a communications frame exchanged in the conventional example includes a synchronization bit stream (preamble) for allowing bit synchronization, a frame synchronization bit stream (unique word) for allowing frame synchronization, data including a communications message, a check code (e.g., a CRC) for an error detection, and the like.

First, the microcomputer unit 1300 awaits in a sleep mode until a frame synchronization detection signal is outputted from the frame synchronization detection unit 123 of the interface unit 1200. And, when the RF unit 1100 receives a radio signal and a frame synchronization detection signal is outputted from the frame synchronization detection unit 123 of the interface unit 1200, the microcomputer unit 1300 starts a rising edge interrupt process in synchronization with rising of the frame synchronization detection signal.

When the microcomputer unit 1300 starts the rising edge interrupt process, the controller 132 thereof instructs the interface unit 1200 to output the reception data stored in the reception buffer 124. In the microcomputer unit 1300, the reception data outputted from the reception buffer 124 is transmitted to the RAM 131 by the transmission unit 133, and the controller 132 decodes it into the original message.

Further, when a bit stream of a prescribed length is received from the reception buffer 132, the controller 132 outputs a reset signal to the RF unit 1100 and the interface unit 1200. When the RF unit 1100 and the interface unit 1200 receive the reset signal from the controller 132, the sampling clock generating unit 112 and the frame synchronization detection unit 123 are reset.

In the above conventional example, normally, only the RF unit 1100 and the interface unit 1200 operate and the microcomputer unit 1300 is in a sleep mode, thereby reducing power consumption. Further, since a processing load of the microcomputer unit 1300 is reduced during standby, an inexpensive (low performance) microcomputer may be used.

Herein, it happens that the demodulation unit 111 of the RF unit 1100 outputs a signal such as a random bit stream due to the influence of thermal noise or radio wave noise even while the antenna 1000 is not receiving a radio signal. Further, the likelihood is that the random bit stream includes the same bit stream as the bit stream (unique word) of the frame synchronization part. Accordingly, the frame synchronization detection unit 123 may erroneously detect a frame synchronization part and output a frame synchronization detection signal.

Even in this case, the microcomputer unit 1300 starts a rising edge interrupt process in synchronization with rising of the frame synchronization detection signal and the controller 132 instructs the interface unit 1200 to output the reception data stored in the reception buffer 124. Further, in the microcomputer unit 1300, the reception data outputted from the reception buffer 124 is transmitted to the RAM 131 by the transmission unit 133, and the controller 132 decodes it into the original message (see FIG. 17).

In the meantime, the sampling clocking generating unit 112 of the RF unit 1100 continuously monitors a bit stream of the demodulation signal demodulated by the demodulation unit 111. Since a bit width (pulse width) of the random bit stream is not uniform, the sampling clock generating unit 112 determines soon that there is out of synchronization and stops outputting of the sampling clock. When outputting of the sampling clock is stopped, the frame synchronization detection unit 123 also stops outputting of the frame synchronization detection signal.

Further, when the frame synchronization detection signal falls before a bit stream having a prescribed length is received from the reception buffer 124, the microcomputer unit 1300 starts a falling edge interrupt process in which the data (bit stream) received from the reception buffer 124 is discarded and a reset signal is outputted to the RF unit 1100 and the interface unit 1200, and then turns to be in standby status (see FIG. 17).

[Patent Document 1] Japanese Patent Application Publication No. 2010-28331

[Patent Document 2] Japanese Patent Application Publication No. 2008-176515

[Patent Document 3] Japanese Patent Application Publication No. 2006-239731

By the way, among the two types of local oscillators described above, the local oscillator using a frequency multiplier circuit advantageously consumes less power in comparison to the local oscillator using a PLL circuit. On the contrary, the latter local oscillator has a wider variable range of frequency than that of the former local oscillator. In many cases, general wireless transceivers employ the local oscillator using a PLL circuit in consideration of the fact that the variable range of frequency is wide. However, the use of the PLL circuit increases power consumption in comparison to the case of using a frequency multiplier circuit. Especially, in case where a wireless transceiver is mounted in the device which uses a battery as a power source, it is preferred that the former local oscillator (i.e., the local oscillator using a frequency multiplier circuit) which consumes less power is employed, to thereby lengthening a life span of the battery.

In the fire warning system of Patent Document 2, the operation controller is intermittently operated in order to reduce power consumption, and the operation controller started up by a timer checks a state of the reception signal received by the wireless reception/transmission unit, i.e., determines whether or not a radio wave can be received based on a measurement result of a reception signal strength.

Here, when it is determined that the radio wave cannot be received, the operation controller stops a transmission/reception operation of the wireless transmission/reception unit and then transits its operation state to a sleep state. However, the operation controller keeps operating while the wireless transmission/reception unit is measuring the reception signal strength, which results in unnecessary power consumption and reducing a life span of the battery as much.

Further, in Patent Document 3, if a regular radio signal is received immediately after an erroneous synchronization occurs due to thermal noise or radio wave noise, there is a possibility that the regular radio signal is not received normally. The case in which such a phenomenon occurs will be described with reference to the time chart shown in FIG. 18. In FIG. 18, N is a random value obtained by demodulating thermal noise, P is a preamble, U is a unique word, and 1,2, 3 ... are data.

It is assumed that a frame synchronization detection signal rises due to an error detection at the time of t1, the microcomputer unit 1300 starts a rising edge interrupt process, and a regular radio signal is received in succession. Since a pulse width of a bit stream of a demodulation signal change at the time of t9 when the regular radio signal is inputted, the sampling clock generating unit 112 often determines that it is a synchronization loss.

Here, there may occur a case where the frame synchronization detection signal falls due to a synchronization loss at the time t2 before the controller 132 outputs, at the time t3, a control signal for instructing the interface unit 120 to output the reception data stored in the reception buffer 124. In this case, since the control signal is outputted from the microcomputer unit 1300 although the frame synchronization detection signal has fallen due to the synchronization loss, reception data is outputted from the reception buffer 124 to the microcomputer unit 1300 in synchronization with falling of the control signal at the time t4.

Further, the microcomputer unit 1300 detects falling of the frame synchronization detection signal since the rising edge interrupt processing is finished, starts a falling edge interrupt process, and discards accumulated reception data (t=t5).

Meanwhile, after the time t2 at which the synchronization loss is determined, the frame synchronization detection unit 123 detects a unique word from the demodulation signal of the regular radio signal and accordingly the frame synchronization detection signal rises (t=t5), while the microcomputer unit 1300 is executing the falling edge interrupt process at the time t5. When the falling edge interrupt process is terminated (t=t6), the microcomputer unit 1300 detects rising of the frame synchronization detection signal and starts a rising edge interrupt process, and the controller 132 outputs a control signal for instructing the interface unit 1200 to output the reception data stored in the reception buffer 124 (time t=t8). Accordingly, the reception data starts to be accumulated at the time t8. However, the reception data is continuously outputted from the time t4 of the output instruction caused by the erroneous detection.

That is, the reception data of the regular radio signal had already been started to be outputted from the buffer 124 at the time t7 when the control signal is output from the microcomputer unit 1300. Therefore, although the microcomputer unit 1300 starts to receive data at the time t8 when the control signal falls, data corresponding to 3 bits already outputted cannot be received. Further, the microcomputer unit 1300 instructs the interface unit 1200 to discard the reception data at the timing when the reception data is deleted. Accordingly, even when a control signal for instructing to accumulate reception data is outputted after a next frame synchronization detection, the reception data may not be accumulated in the reception buffer 124 because it is after the frame synchronization detection signal has been risen (the time t=t5).

SUMMARY OF THE INVENTION

In view of the above, the present invention provides a wireless transmitter/receiver capable of securing a variable range of frequency while reducing power consumption in a local oscillator.

Further, the present invention provides a wireless communication system in which power consumption of a wireless communications station is further reduced.

Furthermore, the present invention provides a wireless communication device capable of properly receiving a regular radio signal even immediately after erroneous synchronization.

In accordance with a first aspect of the present invention, there is provided a wireless transmitter/receiver, including: a local oscillator which oscillates at a predetermined local oscillation frequency; a mixer for mixing a local oscillation signal having the local oscillation frequency outputted from an output terminal of the local oscillator and a radio signal received by an antenna; a modulation circuit for modulating the local oscillation signal to generate a radio signal; and a transmission/reception switching unit which selectively switches over between a reception state in which the output terminal of the local oscillator is connected to the mixer and a transmission state in which the output terminal is connected to the antenna without passing through the mixer.

Further, the local oscillator includes: a reference oscillation unit which oscillates at a predetermined reference oscillation frequency lower than the local oscillation frequency; a first frequency conversion unit and a second frequency conversion unit which convert a reference oscillation signal having the reference oscillation frequency outputted from an output terminal of the reference oscillation unit into the local oscillation signal; a first switching unit which selectively switches over between a first input state in which the output terminal of the reference oscillation unit is connected to an input terminal of the first frequency conversion unit and a second input state in which the output terminal of the reference oscillation unit is connected to an input terminal of the second frequency conversion unit; and a second switching unit which selectively switches over between a first output state in which the output terminal of the local oscillator is connected to the output terminal of the first frequency conversion unit and a second output state in which the output terminal of the local oscillator is connected to an output terminal of the second frequency conversion unit, while cooperating with switching operation of the first switching unit, and wherein the second frequency conversion unit includes a voltage controlled oscillator, a phase comparator, a divider, a loop filter, a phase locked loop circuit having a charge pump, and the first frequency conversion unit includes a frequency multiplying circuit having power consumption smaller than that of the phase locked loop circuit.

With this configuration, a variable range of frequency can be secured while reducing power consumption in a local oscillator.

In accordance with a second aspect of the present invention, there is provided a wireless communication system for transmitting and receiving a radio signal by a radio wave between multiple wireless stations, each of the wireless stations including: a wireless transmission/reception unit which transmits and receives the radio signal; a radio level measuring unit which measures a received signal strength of the radio signal received by the wireless transmission/reception unit; a timer which outputs a start-up signal whenever a predetermined intermittent reception time is lapsed; and an operation controller which analyzes the reception signal received by the wireless transmission/reception unit to obtain information related to the wireless transmission/reception unit itself.

Further, the wireless transmission/reception unit autonomously executes an operation of receiving the radio signal based on an operation command set by the operation controller, and the radio level measuring unit autonomously executes an operation of measuring the received signal strength of the radio signal received by the wireless transmission/reception unit based on an operation command set by the operation controller; the operation controller sets an operation command in the wireless transmission/reception unit and the radio level measuring unit when the operation controller in a sleep state is activated by the start-up signal from the timer, and shifts to the sleep state until the measuring of the received signal strength by the radio level measuring is completed; and, when the measurement result of the received signal strength by the radio level measuring unit is equal to or greater than a predetermined reference value, the wireless transmission/reception unit continuously performs a reception operation and the operation controller analyzes the reception signal; and, when the measurement result is smaller than the reference value, the wireless transmission/reception unit stops the reception operation.

With this configuration, the wireless communication system can be realized which allows power consumption of a wireless communications station to be further reduced by decreasing power consumption of an operation controller.

In accordance with a third aspect of the present invention, there is provided a wireless communication device, including: a wireless transmission/reception unit which processes a radio signal received by an antenna to convert it into a bit stream of a pulse signal; and an operation controller which obtains information included in the radio signal from the bit stream outputted from the wireless transmission/reception unit, wherein a communications frame of the radio signal includes a synchronization bit stream for bit synchronization, a frame synchronization bit stream for frame synchronization, and data corresponding to the information.

Further, the wireless transmission/reception unit includes: a demodulation unit which demodulates the radio signal into a demodulation signal formed of a bit stream of a pulse signal; a frame synchronization detection unit which detects the frame synchronization bit stream from the bit stream of the demodulation signal and outputs a frame synchronization detection signal; a reception data buffer which temporarily accumulates the demodulation signal outputted from the demodulation unit when the frame synchronization detection signal is outputted; and a command processing unit for outputting the reception data accumulated in the reception data buffer to the operation controller when a reception data output command is received from the operation controller.

Furthermore, the operation controller includes: an interface unit which communicates a signal with the wireless transmission/reception unit; and a central processing unit which executes processing of obtaining information included in the radio signal from the bit stream outputted from the wireless transmission/reception unit, or processing of outputting the reception data output command to the wireless transmission/reception unit while the frame synchronization detection signal is being output. In addition, when the reception data output command is not received until the frame synchronization detection unit stops outputting of the frame synchronization detection signal after starting to output the frame synchronization detection signal, the command processing unit controls the reception data buffer not to output the reception data accumulated therein even if the reception data output command is outputted from the central processing unit of the operation controller before the frame synchronization detection unit starts to output a next frame synchronization detection signal.

With this configuration, even immediately after erroneous synchronization, a regular radio signal can be properly received.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Figure 1:
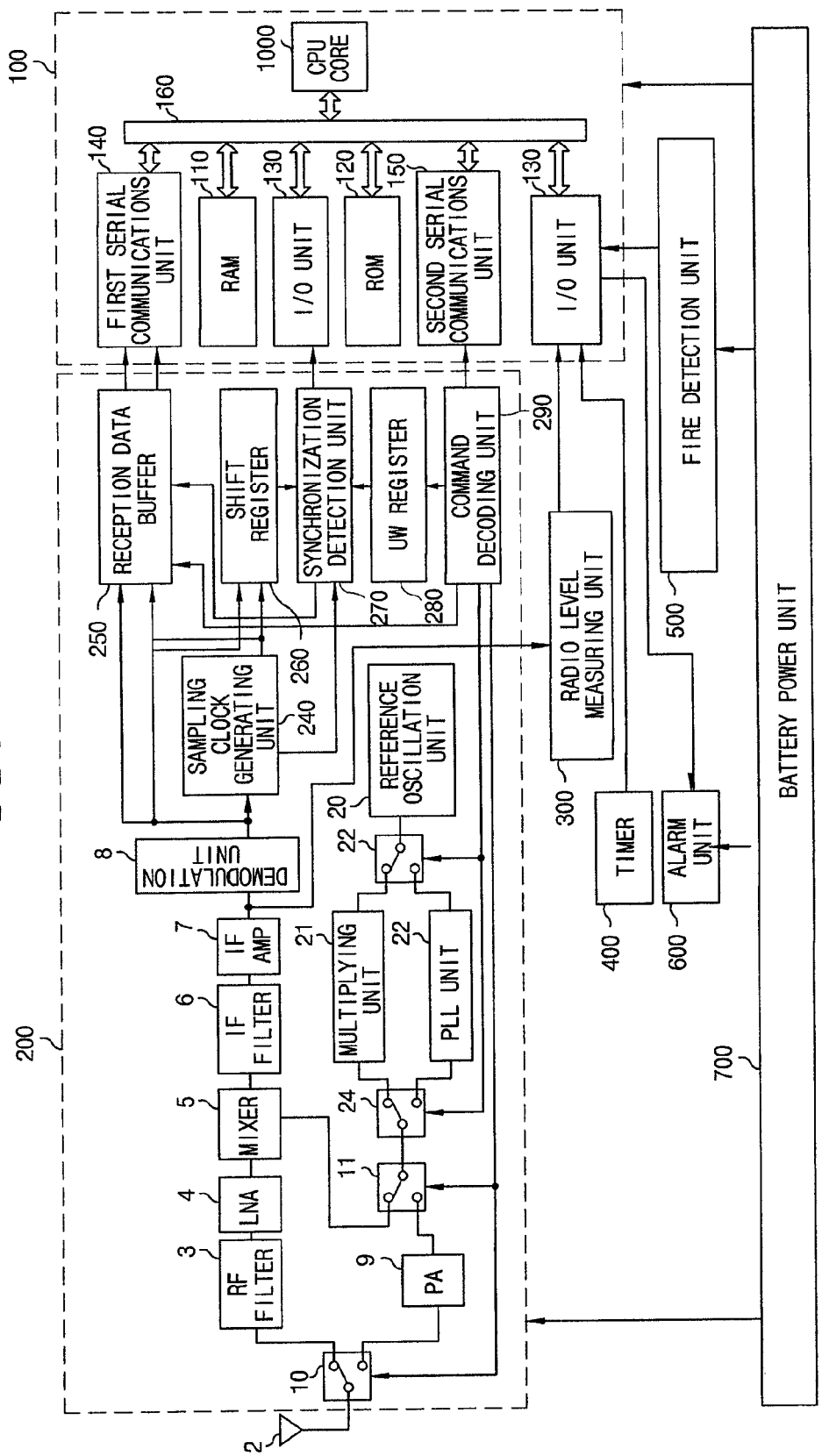
FIG. 1 is a block diagram schematically showing a wireless communication system in accordance with the present invention.

Hereinafter, embodiments of the present invention will be described in more detail with reference to the accompanying drawings which form a part hereof. In the drawings, the same reference numerals are used for the same or like parts throughout the drawings, and a redundant description thereof will be omitted.

Embodiment 1

A first embodiment of the present invention will be described in detail with reference to FIGS. 1 to 5. FIG. 1 illustrates a wireless communication system employing a wireless transceiver in accordance with the first embodiment of the present invention.

Figure 2:
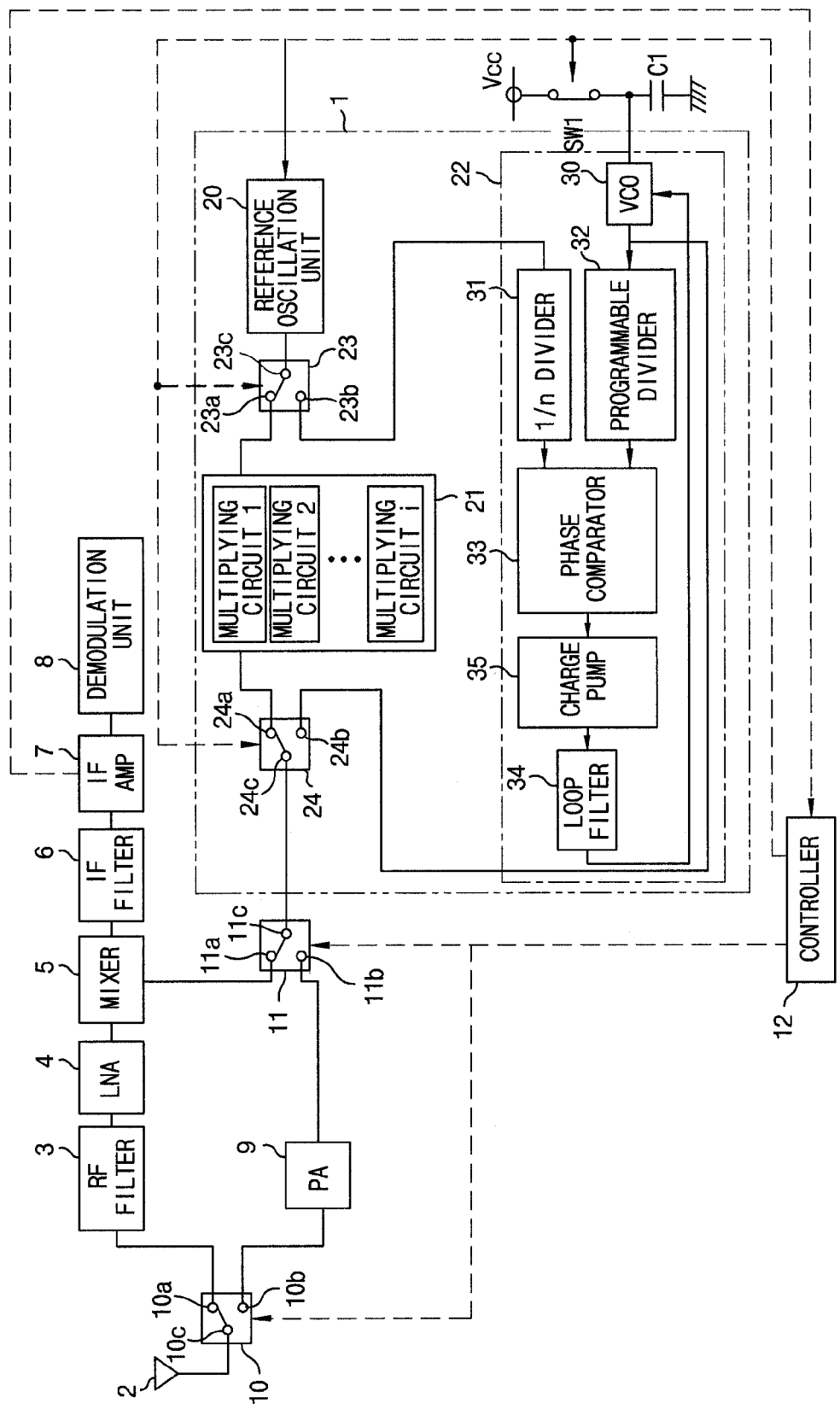
FIG. 2 is a block diagram showing a wireless transceiver in accordance with a first embodiment of the present invention.

As shown in FIG. 2, the wireless transceiver (transmitter/receiver) of the present embodiment includes a local oscillator 1, an antenna 2, an RF filter 3, a low noise amplifier (LNA) 4, and a mixer 5. Further, the wireless transceiver includes an intermediate frequency (IF) filter 6, an IF amplifier 7, a demodulation unit 8, a transmission unit 9, an antenna switching unit 10, a transmission/reception switching unit 11, and a controller (which corresponds to an operation controller in FIG. 1).

Here, the wireless transceiver of the present embodiment employs, for example, a frequency modulation (frequency shift keying (FSK)) scheme as a modulation scheme. When it transmits a radio signal from the antenna 2, it executes modulation by changing a dividing ratio m of a programmable divider 32 (to be described later) according to a signal to be transmitted and transmits it. Further, when it receives the radio signal by the antenna 2, it converts the radio signal into a signal having an IF frequency lower than that (radio frequency) of the radio signal and then executes demodulation on the signal by the demodulation unit 8.

However, the modulation method is not limited to the foregoing modulation processing. For example, a signal (local oscillation signal) outputted from the local oscillator 1 may be mixed with the modulation signal by the transmission unit 9, a capacity of a variable capacitance unit such as a switched capacitor or a variable capacitance diode (to be described later) may be changed based on a modulation signal. Further, the modulation scheme is not limited to the frequency modulation scheme, and for example, a phase modulation (phase shift keying) scheme such as a binary phase shift keying (BPSK) or the like may be used.

The local oscillator 1 includes a reference oscillation unit 20, a multiplying unit 21, a PLL unit 22, a first switching unit 23, and a second switching unit 24. The reference oscillation unit 20 oscillates at a reference oscillation frequency fx lower than the radio frequency to output a reference oscillation signal. Herein, the reference oscillation unit 20 includes a variable capacitance unit (not shown) having a switched capacitor, a variable capacitance diode or the like which is not shown. Accordingly, the controller 12 can select the reference oscillation frequency fx from among multiple frequencies fx1, fx2, fx3, . . . by changing a capacity of the variable capacitance unit.

The multiplying unit 21, which corresponds to a first frequency conversion unit, frequency-converts the reference oscillation signal outputted from the reference oscillation unit 20 into a signal (local oscillation signal) having a local oscillation frequency fy. Similarly, the PLL unit 22, which corresponds to a second frequency conversion unit, frequency-converts the reference oscillation signal outputted from the reference oscillation unit 20 to the local oscillation signal having the local oscillation frequency fy.

The first switching unit 23 selectively switches between a first input state in which an output terminal of the reference oscillation unit 20 is connected to an input terminal of the multiplying unit 21 and a second input state in which the output terminal of the reference oscillation unit 20 is connected to an input terminal of the PLL unit 22. The second switching unit 24 selectively switches between a first output state in which an output terminal of the local oscillator 1 is connected to an output terminal of the multiplying unit 21 and a second output state in which the output terminal of the local oscillator 1 is connected to an output terminal of the PLL unit 22.

The multiplying unit 21 includes a frequency multiplier circuit outputting a signal (i.e., the local oscillation signal) having a frequency (the local oscillation frequency fy) of an integer multiple of the frequency fx of the input signal (i.e., the reference oscillation signal) by using non-linearity of input/output characteristics of, e.g., a transistor or the like. Here, since the multiplying unit 21 has been known, a description of a detailed configuration and operation thereof will be omitted. Alternatively, a known delay locked loop circuit may also be used as the multiplying unit 21.

The PLL unit 22, which is well known, includes a voltage controlled oscillator (VOC) 30, a 1/n divider 31, a programmable divider 32, a phase comparator 33, a loop filter 34, and a charge pump 35. The 1/n divider 31 divides the reference oscillation signal by n (where n is a positive integer). Further, the programmable divider 32 divides an output signal from the VCO 30 by m (where m is a positive integer which is different from n, or a fractional number). The phase comparator 33 detects a phase difference between the two dividers 31 and 32 and outputs a signal corresponding to the phase difference.

The charge pump 35 charges or discharges electric charges based on a signal outputted from the phase comparator 33. The loop filter 34 smoothes a signal outputted by charging or discharging of the charge pump 35. The VCO 30 is controlled by a DC signal outputted from the loop filter 34, and a local oscillation signal having the local oscillation frequency fy (=m/n×fx) is outputted from the PLL unit 22. Here, the dividing numbers n and m of the two dividers 31 and 32 may be set to arbitrary integer values (here, m may be a fractional number) by the controller 12, respectively, and the local oscillation frequency fy of the local oscillator 1 can be changed by setting the dividing numbers n and m as appropriate integer values (here, m may be a fraction number).

Here, when comparing the multiplying unit 21 and the PLL unit 22 having the configuration as mentioned above, power consumption of the multiplying unit 21 is smaller than that of the PLL unit 22, and a variable range of the local oscillation frequency fy of the PLL unit 22 is wider than that of the multiplying unit 21.

In case of the PLL unit 2, an operation power of the VCO 30 is supplied from an external power source (system power source) Vcc, and a switch SW1 is provided to turn on or off power supply to the VCO 30 from the system power source Vcc. That is, when the switch SW1 is turned off by the controller 12, a power terminal is separated from the system power source Vcc, turning off the VCO 30, and when the switch SW1 is turned on, the power terminal is connected to the system power source Vcc, operating the VCO 30. Further, a bypass capacitor C1 electrically connects the power terminal of the VCO 30 with a ground with respect to an alternating current to thereby stabilize a power source voltage.

In the first switching unit 23, a common terminal 23c connected to the output terminal of the reference oscillation unit 20 is selectively switched between a switching terminal 23a connected to an input terminal of the multiplying unit 21 and a switching terminal 23b connected to the input terminal of the PLL unit 22 (an input terminal of the 1/n divider 31). Also, in the second switching unit 24, a common terminal 24c connected to a common terminal 11c of the transmission/reception switching unit 11 is selectively switched between a switching terminal 24a connected to the output terminal of the multiplying unit 21 and a switching terminal 24b connected to the output terminal of the PLL unit 22 (the output terminal of the VCO 30).

In the transmission/reception switching unit 11, a common terminal 11c is selectively switched between a switching terminal 11a connected to an input terminal of the mixer 5 and a switching terminal 11b connected to an input terminal of the transmission unit 9. Further, in the antenna switching unit 10, a common terminal 10c connected to the antenna 2 is selectively switched between a switching terminal 10a connected to an input terminal of the RF filter and a switching terminal 10b connected to an output terminal of the transmission unit 9.

The antenna switching unit 10, the transmission/reception conversion unit 11, the first and second switching units 23 and 24 are controlled to be switched by the controller 12. The controller 12 substantially simultaneously controls switching of the first switching unit 23 and the second switching unit 24, and substantially simultaneously controls switching of the antenna switching unit 10 and the transmission/reception switching unit 11.

Here, in terms of preventing undesirable erroneous operation, the four units of the first switching unit 23, the second switching unit 24, the antenna switching unit 10, and the transmission/reception switching unit 11 may be substantially simultaneously controlled to be switched, or preferably, the antenna switching unit 10 and the transmission/reception switching controller 11 are substantially simultaneously controlled to be switched after the first switching unit 23 and the second switching unit 24 are first substantially simultaneously controlled to be switched.

The transmission unit 9 includes an amplifier for amplifying a radio signal (RF signal) after modulation, and amplifies the radio signal (RF signal) outputted from the local oscillator 1 and outputs the same to the antenna switching unit 10. And, a radio signal inputted through the antenna switching unit 10 is radiated as a radio wave from the antenna 2. The transmission unit 9 is well known, so a description of a detailed configuration and operation thereof will be omitted.

Here, the local oscillator 1 selectively outputs a local oscillation signal having a receiving local oscillation frequency (i.e., a frequency equal to a difference between a radio frequency and an intermediate frequency) which is used in receiving and is lower than a radio frequency of a radio signal, and a local oscillation signal having a transmitting local oscillation frequency which is used in transmitting and is equal to a radio frequency. In the wireless transceiver in accordance with the present embodiment, the first frequency conversion unit (the multiplying unit 21) outputs the local oscillation signal which is relatively frequently selected among the receiving local oscillation signal and the transmitting local oscillation signal, while the second frequency conversion unit (the PLL unit 22) outputs the local oscillation signal which is less frequently selected thereamong.

For example, when the frequency of receiving a radio signal (including an standby operation in which a radio signal to be received is being awaited, and this is also applied in the same manner hereinafter) is higher than the frequency of transmitting a radio signal, it is possible to reduce power consumption by outputting the receiving local oscillation signal through the multiplying unit 21 rather than through the PLL unit 22. Conversely, when the frequency of transmitting a radio signal is higher than the frequency of receiving a radio signal, it is possible to reduce power consumption by outputting the transmitting local oscillation signal through the multiplying unit 21 rather than through the PLL unit 22. The conditions of using the multiplying unit 21 and the PLL unit 22 are not limited to the frequencies of the transmission and the reception.

For example, as described later, in case where multiple frequency channels are selectable as a radio frequency, the multiplying unit 21 may be used as a frequency conversion unit of the local oscillator 1 when a default (initial state) frequency channel is selected, while the PLL unit 22 may be used as the frequency conversion unit of the local oscillator 1 when channels other than the default frequency channel are selected. This can also reduce power consumption.

Figure 5:
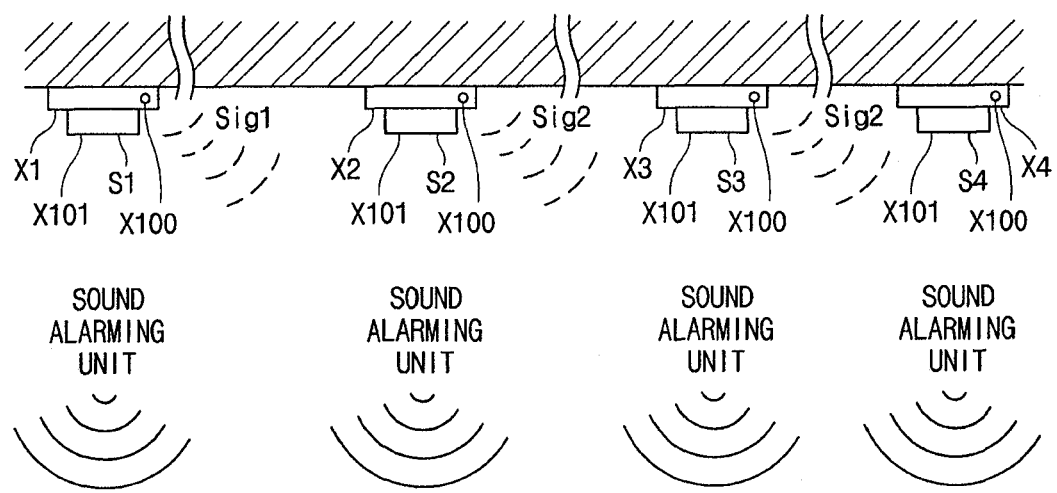
FIG. 5 is a view showing a configuration of a wireless communication system constituted by wireless communication devices each mounting the wireless transceiver thereon.

The wireless transceiver in accordance with this embodiment may be used in a wireless communication device Xj (where j is a natural number) as shown in FIG. 5, for example.

The wireless communication device Xj includes at least one of various types of environment measurement sensors Sk (where k is a natural number irrelevant to j) such as an optical sensor S1, a thermal sensor S2, a chemical sensor S3, a pressure sensor S4, . . . and the like.

Further, when the wireless communication device Xj, in a state of being attached to a ceiling surface, a wall surface or the like, senses a change in a surrounding environment of an installation location, it transmits a radio signal to inform other wireless communication device Xj of the change. Here, wireless communication device Xj all may have the same type of environment measurement sensor Sk or each may have different type of environment measurement sensor Sk.

For example, a wireless communication device X1 activates a wireless transceiver thereof (the wireless transceiver in accordance with the present embodiment) at a constant intermittent reception interval, and receives a first radio signal Sig1 sent out from one of the other wireless communication devices X2, X3, X4, . . . . In this case, when the wireless communication device X1 cannot receive the first radio signal Sig1 having a certain time period from any one of the other wireless communication devices X2, X3, X4, . . . , the wireless communication device X1 immediately stops the wireless transceiver to prevent battery consumption.

On the other hand, when the wireless communication device X1 can receive the first radio signal Sig1, the wireless communication device X1 transmits a second radio signal Sig2 from the wireless transceiver of the wireless communication device X1 itself, the second radio signal Sig2 indicating that the first radio signal Sig1 could be received by wireless communication device X1 itself and the first radio signal Sig1 is being transmitted to the other unspecified wireless communication devices X2, X3, X4, . . . .

As shown in FIG. 5, each of the wireless communication devices Xj includes at least one of a visual notification unit X100 sensed visually by human and a sound alarming unit X101 sensed acoustically. Thus, when one (the wireless communication device X1 in FIG. 5) of the wireless communication devices Xj senses the abnormal occurrence therearound, it operates the visual notification unit X100 or the sound alarming unit X101 to notify surroundings of the abnormal occurrence and simultaneously transmit the first radio signal Sig1.

Further, when another wireless communication device (in FIG. 5, only the wireless communication device X2 closest to the wireless communication device X1) receives the first radio signal Sig1, it analyzes an address of the first radio signal Sig1, and transmits a second radio signal Sig2 to the other wireless communication devices (in FIG. 5, wireless communication devices X3 and X4 other than X1 and X2) which have not received the first radio signal Sig1. The wireless communication device X3 cannot recognize whether or not the wireless communication device X4 has received the second radio signal Sig2 from the wireless communication device X2, so the wireless communication device X3, upon receiving the second radio signal Sig2, continuously transmits the second radio signal Sig2 to the wireless communication device X4.

As a result, in addition to the single wireless communication device (the wireless communication device X1) which has firstly sensed the abnormal occurrence, all the pre-registered wireless communication devices (the wireless communication devices X1, X1, X3, and X4) can cooperate and notify the surroundings of the abnormal occurrence.

An operation of the wireless transceiver of the present embodiment will be described in more detail with relation to the foregoing operation of the wireless communication device.

First, while no the wireless communication devices senses a change in a surrounding environment of an installation location, the controller 12 repeatedly counts intermittent reception intervals by a timer (not shown), and activates the wireless transceiver in a receivable state whenever the counting of the intermittent reception interval is completed.

Specifically, when the counting of intermittent reception interval is completed, the controller 12 connects the common terminal 10c of the antenna switching unit 10 to the switching terminal 10a of the RF filter 3 and simultaneously connects the common terminal 11c of the transmission/reception switching unit 11 to a switching terminal 11a of the mixer 5. Further, the controller 12 connects the common terminal 23c of the first switching unit 23 to the switching terminal 23a connected to the input terminal of the multiplying unit 21, and simultaneously connects the common terminal 24c of the second switching unit 24 to the switching terminal 24a connected to the output terminal of the multiplying unit 21. In the meantime, the controller 12 turns off the switch SW1 and separates the power source terminal of the VCO 30 from the system power source Vcc to thereby stop the PLL unit 22.

In the receivable state, the IF amplifier 7 amplifies an intermediate frequency (IF) signal and outputs a received signal strength indication (RSSI) signal indicating a signal strength of an input signal (IF signal before being amplified) to the controller 12. When the RSSI signal is smaller than a threshold value, the controller 12 determines that the radio wave received by the antenna 2 is not a desired wave (a radio wave transmitted from another wireless communication device), and immediately stops the wireless transceiver. On the other hand, when the RSSI signal is equal to or greater than the threshold value, the controller 12 determines that the received radio wave is highly likely to be a desired wave, and demodulates it by the demodulation unit 8 without stopping the wireless transceiver.

When the radio signal demodulated by the demodulation unit 8 is the first radio signal transmitted from another wireless communication device, the controller 12 connects the common terminal 10c of the antenna switching unit 10 to the switching terminal 10b of the transmission unit 9 and simultaneously connects the common terminal 11c of the transmission/reception switching unit 11 to the switching terminal 11b of the transmission unit 9. Further, the controller 12 connects the common terminal 23c of the first switching unit 23 to the switching terminal 23b connected to the input terminal of the PLL unit 22 and simultaneously connects the common terminal 24c of the second switching unit 24 to the switching terminal 24b connected to the output terminal of the PLL unit 22. Then, the controller 12 turns on the switch SW1 and connects the power source terminal of the VCO 30 to the system power source Vcc to thereby operate the PLL unit 22.

In this case, the controller 12 encodes a transmission frame including a signal indicating that the first radio signal to be transmitted to the other wireless communication devices is transmitted, and generates a signal to be wirelessly transmitted by modulating the local oscillation signal with the frame by using the PLL unit 22 of the local oscillator 1. Then, the signal is amplified by the transmission unit 9, and is outputted to the antenna 2 through the antenna switching unit 10. Thus, the second radio signal is transmitted from the antenna 2.

When the wireless communication device intermittently performs reception, power consumption can be reduced by operating the first frequency conversion unit (the multiplying unit 21) as the frequency conversion unit of the local oscillator 1. Further, when the wireless communication device transmits the first or the second radio signal, as described above, the second frequency conversion unit (the PLL unit 22) is selected as a frequency conversion unit of the local oscillator 1 and serves as a modulation circuit, thereby covering a frequency (radio frequency) that the multiplying unit 21 cannot cope with. As a result, a variable range of frequency can be secured while reducing power consumption of the local oscillator 1.

In the above-described wireless communication system, since it is determined that the frequency that the wireless transceiver of each wireless communication device Xj operates in a receivable state is higher than the frequency that it operates in a transmittable state, as described above, power consumption can be reduced by selecting the multiplying unit 21 in the receivable state. Further, in the transmittable state, the PLL unit 22 is selected so that a selectable range (variable range) of the local oscillation frequency can be secured, which makes it possible to transmit a signal at a desired radio frequency.

As described above, it is preferred that the frequency (radio frequency) of the radio wave used by the wireless communication device can be appropriately selected based on an environment of an installation location among multiple radio frequencies (frequency channels). When a frequency channel changes, the local oscillation frequency fy of the local oscillator 1 needs to be changed depending on a frequency channel. In the PLL unit 22, the local oscillation frequency fy can be easily changed by adjusting the dividing numbers j and k, but it is not easy to adjust the multiplier of the multiplying unit 21 to change the local oscillation frequency fy in comparison to the adjustment of the dividing numbers j and k of the PLL unit 22.

To that end, in the present embodiment, a variable capacitance unit (not shown) including a switched capacitor, a variable capacitance diode or the like is provided in the reference oscillation unit 20. Accordingly, the controller selects the reference oscillation frequency fx of the reference oscillation unit 20 among multiple frequencies fx1, fx2, fx3, . . . by changing a capacity of the variable capacitance unit. As a result, the local oscillation frequency fy can be easily changed while fixing the multiplier of the multiplying unit 21. Further, even when a frequency channel of a radio frequency is changeable, the multiplying unit 21 can be used as a frequency conversion unit of the local oscillator 1 in the receivable state. Therefore, even in the receivable state, power consumption of the wireless transceiver (the local oscillator 1) can be reduced by deleting a need for using the PLL unit 22.

Meanwhile, in case where the wireless transceiver is activated to perform a receiving operation at an intermittent reception interval and power supply to the local oscillator 1 is turned on and off accordingly, charging current flows into the bypass capacitor C1 connected to the power terminal of the VCO 30 in the PLL unit 22, thereby unnecessarily consuming power. However, in the present embodiment, the connection between the bypass capacitor C1 and the system power source Vcc is switched by a opening/closing unit (the switch SW1). Accordingly, the controller 12 closes (turns on) the switch SW1 only when the PLL unit 22 is used as a frequency conversion unit of the local oscillator 1. Thus, it is possible to prevent the bypass capacitor C1 from being charged or discharged when the PLL unit 22 is not used, thereby suppressing unnecessary power consumption.

Figure 3A:
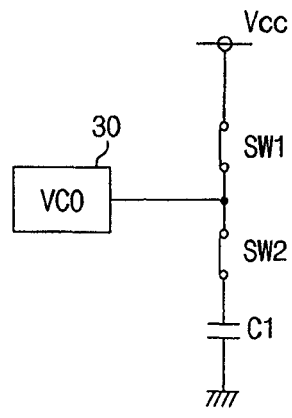
FIGS. 3A and 3B are circuit diagrams of major parts of a local oscillator in the wireless transceiver.

Further, as shown in FIG. 3A, an additional switch SW2 may be added between the power terminal of the VCO 30 and the bypass capacitor C1, and be turned on and off to operate in conjunction with the switch SW1 provided between the power terminal of the VCO 30 and the system power source Vcc.

Figure 3B:
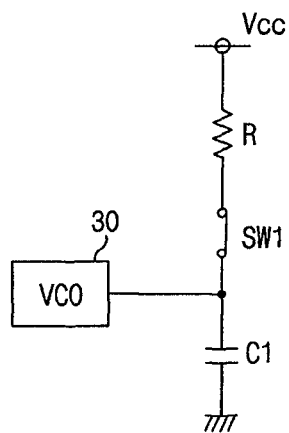

Herein, when the switch SW1 (or the switch SW2) is closed and the bypass capacitor C1 is connected to the system power source Vcc, an inrush current (charging current) may flow, which results into a temporal drop in a voltage of the system power source Vcc. To cope with this, preferably, a current limiting resistor R is provided between the bypass capacitor C1 and the system power source Vcc to limit the inrush current, as shown in FIG. 3B, thereby reducing a temporary drop in the voltage of the system power source Vcc.

Figure 4A:
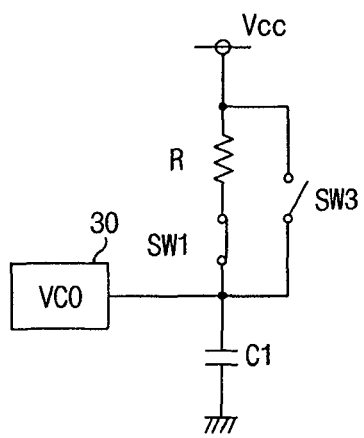
FIGS. 4A and 4B are circuit diagrams of major parts of another example of the local oscillator in the wireless transceiver.
Figure 4B:
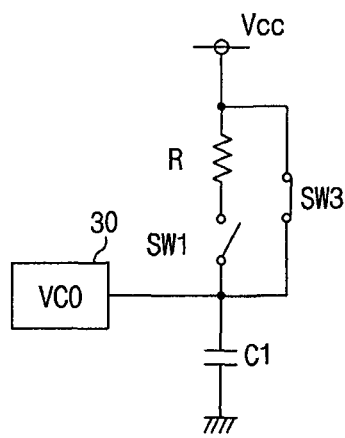

In case of a normal state in which an inrush current does not flow, however, since power is unnecessarily consumed by the current limiting resistor R and the voltage applied to the power terminal of the VCO 30 is dropped, as shown in FIGS. 4A and 4B, preferably, a short-circuit unit (the SW3) for connecting the system power source Vcc and the power terminal of the VCO 30 is provided. Accordingly, the controller 12 closes the switch SW1 in a state in which the switch SW3 is open to thus limit an inrush current by the current limiting resistor R (see FIG. 4A), and, after closing the switch SW3, the controller 12 opens the switch SW1 to thus separate the current limiting resistor R from circuit (see FIG. 4B). As a result, since a current does not flow through the current limiting resistor R in a normal state, unnecessary power consumption and voltage drop can be avoided. Here, the switch SW1 may be in a closed state.

By the way, a condition for switching over, as the frequency conversion unit of the local oscillator 1, between the multiplying unit 21 to the PLL unit 22 is not limited to the above-described reception and transmission frequency. As described above, the multiplying unit 21 generates a local oscillation signal by obtaining a frequency of an integer multiple of a reference oscillation frequency by using the delay locked loop circuit or by using non-linearity. For that reason, comparing to a local oscillation signal outputted from the PLL unit 22, the local oscillation signal outputted from the multiplying unit 21 includes a great amount of unnecessary frequency components which are an integer multiple of the reference oscillation frequency besides the desired local oscillation frequency.

Accordingly, if the multiplying unit 21 is used as a frequency conversion unit of the local oscillator 1, there is a high probability that a radio wave (interference wave) having a frequency different from that of a target radio wave (radio signal) is received and interfering waves (specifically, interfering waves having frequency components of IF±an integer multiple of reference oscillation frequency) is easy to be received. On the contrary, if the PLL unit 22 is used, relatively small unnecessary frequency components are included in the oscillation frequency after the frequency conversion, so it is advantageously hardly affected by interfering waves as compared to the multiplying unit 21. However, since the battery is used as a power source in the foregoing wireless communication device, the life span of the battery is reduced in comparison to the case of using the multiplying circuit when the PLL circuit is used as a frequency conversion unit of a local oscillator.

In this case, only when the reception signal (IF signal) outputted from the mixer 5 is not normally demodulated by the demodulation unit 8, the controller 12 may switch the first switching unit 23 to the second input state and simultaneously switch the second switching unit 24 to the second output state. Specifically, when a bit synchronization of the reception signal (IF signal) is not achieved by the demodulation unit 8 though the RSSI signal is greater than a threshold value, the controller 12 may determines that a radio signal is not normally received due to an influence of interfering waves, and adjusts the first and second switching units 23 and 24 to switch over from the multiplying unit 21 to the PLL unit 22 as the frequency conversion unit of the local oscillator 1. By doing so, the life span of the battery can be lengthened and an influence of interfering waves can be avoided.

Here, if switching over is performed from the multiplying unit 21 to the PLL unit 22 during reception, a radio signal cannot be normally received until a circuit operation of the PLL unit 22 is stabilized. When a intensity of an interfering wave is high in a usage environment of the wireless transceiver (an installation environment of the wireless communication device), the frequency conversion unit of the local oscillator 1 may be frequently switched from the multiplying unit 21 to the PLL unit 22. However, when the intensity of the interfering wave is low in the usage environment, it is expected that a radio signal can be normally received by using the multiplying unit 21 as the frequency conversion unit of the local oscillator 1.

In this regard, the controller 12 may perform a switching control on the first and second switching units 23 and 24 as describe above, during a certain time period from a time point at which the wireless transceiver is started up (i.e., a time point at which the operation of the wireless communication system is started up by the wireless communication device group), and, after a lapse of the certain time period, the controller 12 may keep the state of the first and second switching units 23 and 24 at the time point when the certain time period expires.

Further, when a certain time period (e.g., several hours) has passed after switching from the multiplying unit 21 to the PLL unit 22 during reception, the controller 12 may check whether or not reception is available if the PLL unit 22 is switched from the PLL unit 22 to the multiplying unit 21. When the reception is available, the multiplying unit 21 is used. In this case, when the number of switching the first switching unit 23 to the second input state and simultaneously switching the second switching unit 24 to the second output state exceeds a certain number of times, the controller 12 may switch the first switching unit 23 to the second input state switch and simultaneously the second switching unit 24 to the second output state when starting an intermittent reception.

By doing so, it is possible to further lengthen the life span of the battery by using the multiplying unit 21 as the frequency conversion unit of the local oscillator 1, in an environment in which an influence of interfering wave is small. Further, in an environment in which an influence of interfering wave is large, it is possible to normally and rapidly receive a radio signal by using the PLL unit 22 as the frequency conversion unit of the local oscillator 1.

Generally, an influence of an interfering wave is larger at daytime than during nighttime. In light of this, a clock for counting time may be provided in the controller 12. Accordingly, in a time zone in which a counting time of the clock is daytime, the controller 12 may switch the first switching unit 23 to the second input state and simultaneously switches the second switching unit 24 to the second output state, and, in a time zone of the nighttime, may switch the first switching unit 23 to the first input state and simultaneously switch the second switching unit 24 to the first output state.

By doing so, it is possible to lengthen the life span of the battery by using the multiplying unit 21 as a frequency conversion unit of the local oscillator 1 in the time zone (nighttime) in which an influence of interference is small. Further, it is possible to normally and quickly receive a radio signal by using the PLL unit 22 as a frequency conversion unit of the local oscillator 1 in the time zone (daytime) in which an influence of interference is large.

Meanwhile, the reference oscillation unit 20 may be configured such that multiple types of reference oscillation signals each having different reference oscillation frequencies fx1, fx2, . . . are selectively switched to be output, and the first frequency conversion unit may include a plurality of multiplying circuits 1–i (where i≥2) each having a different multiplier. Accordingly, when a reception signal is not normally demodulated in a state in which the controller 12 has switched the first switching unit 23 to the first input state and simultaneously the second switching unit 24 to the first output state, combinations of the reference oscillation frequencies fxi (i=1, 2, . . . ) of the reference oscillation signals and the multipliers of the multiplying circuits may be sequentially changed without changing the local oscillation frequency fy.

For example, 420 MHz of the local oscillation frequency fy is obtained by multiplying the reference oscillation frequency fx1=52.5 MHz by 8, or multiplying the reference oscillation frequency fx2=70 MHz by 6. In the former case, frequency components of the interfering wave mainly include frequencies of an integer multiple of 52.5 MHz±IF, while, in the latter case, they mainly include frequencies an integer multiple of 70 MHz±IF. That is, the frequencies of the interfering waves are different, and the influence of interfering waves can be reduced by selecting a combination of a reference oscillation frequency and a multiplier in order to avoid an influence of an existing interfering wave.

In this manner, a reception signal may be normally received by changing the combinations of the reference oscillation frequency fxi and the multiplier of the multiplying circuits without changing the local oscillation frequency fy. However, when a reception signal is not normally demodulated by any combination, the controller 12 may switch the first switching unit to the second input state and simultaneously switch the second switching unit 24 to the second output state to thereby select the PLL unit 22.

Hereinafter, in accordance with a second embodiment of the present invention, a wireless communication system (a fire alarm system) will be described where a fire alarm which makes an alarm sound upon detecting a fire and transmits a radio signal (including fire notification information) by using a radio wave serves as a wireless communications station, with reference to FIGS. 6 to 8.

Second Embodiment

Figure 6:
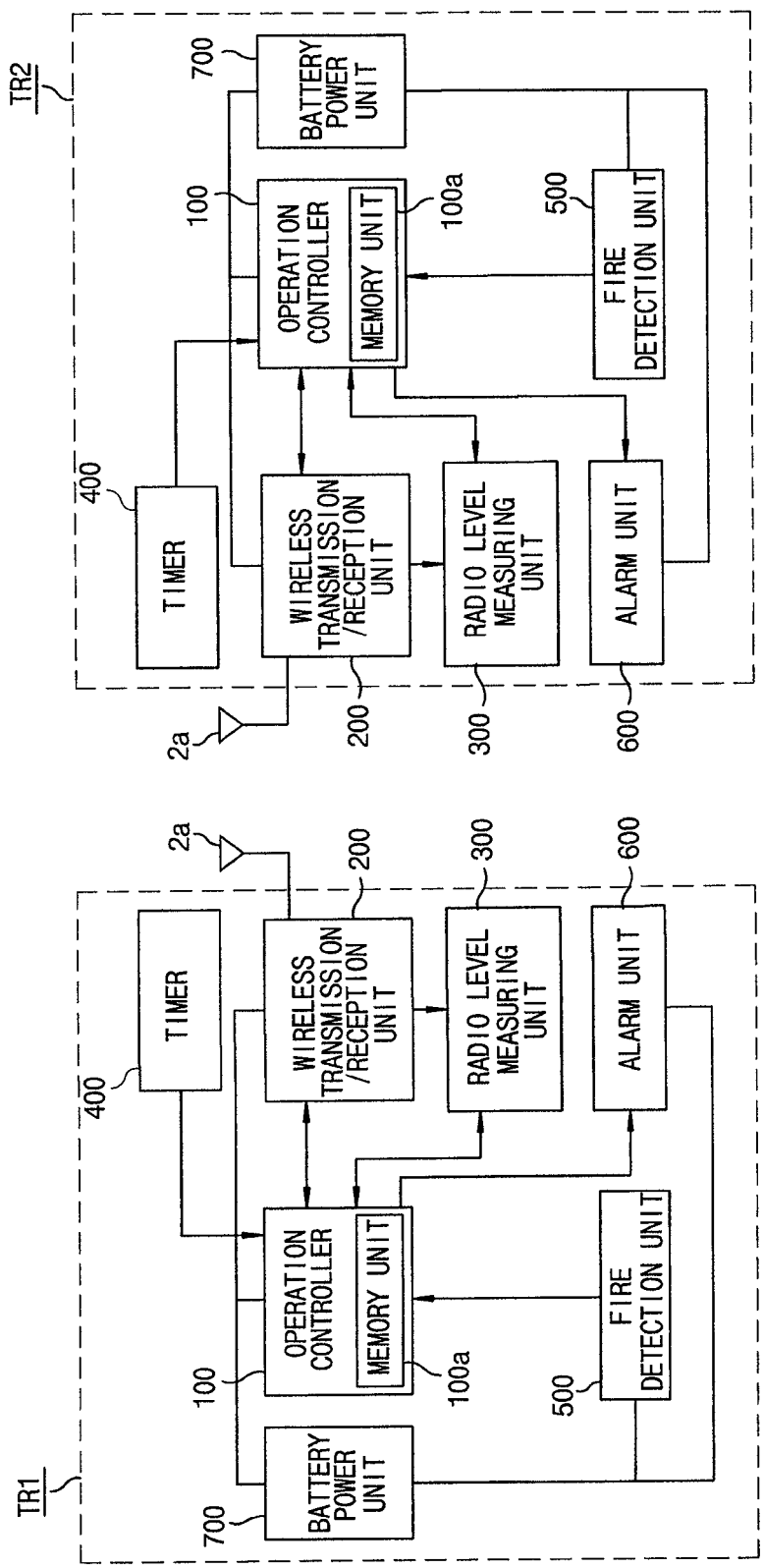
FIG. 6 is a block diagram of a fire alarm (a master station and a slave station) in accordance with a second embodiment of the present invention.
Figure 7:
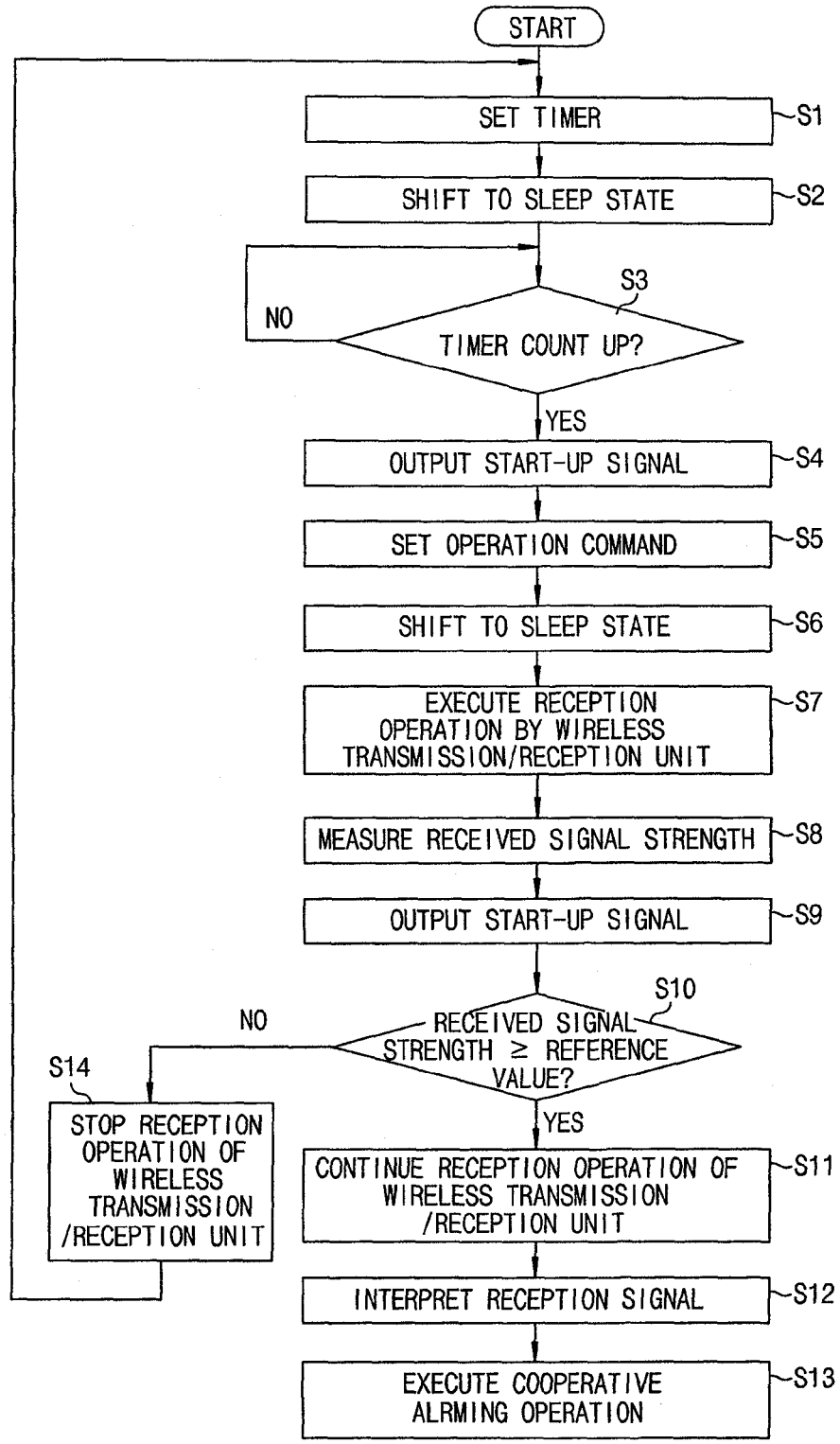
FIG. 7 is a flow chart for explaining an intermittent reception operation of the fire alarm in accordance with the second embodiment.

FIG. 6 is a view showing the configuration of a wireless communication system to which the second embodiment is applicable, which corresponds to a simplified illustration of FIG. 1. In the present embodiment, a fire alarm system includes multiple (two in the drawing) fire alarms TR. In the following description, respective fire alarms will be denoted by fire alarms TR1, TR2, . . . , TRn (where n is a positive integer), and in case of generally describing a fire alarm, a fire alarm TR will be denoted.

The fire alarm TR includes an operation controller 100, a wireless transmission/reception unit 200, a radio level measuring unit 300, a timer 400, a fire detection unit 500, an alarm unit 600, and a battery power unit 700.

The wireless transmission/reception unit 200 transmits a radio signal through a radio wave from an antenna 2a and receives a radio signal transmitted from a different fire alarm TR by the antenna 2a. The wireless transmission/reception unit 200 has a function of autonomously executing a certain operation, namely, an operation of receiving a radio signal when an operation command is set by the operation controller 100. Further, the wireless transmission/reception unit 200 may be used, for example, based on 'wireless communications station of a small power security system' prescribed in Subparagraph 3, Paragraph 4, Article 6 of enforcement regulations, Japan Radio Law.

The radio level measuring unit 300 measures a reception signal strength of a radio signal received by the wireless transmission/reception unit 200. The radio level measuring unit 300 has a function of autonomously executing a certain operation, namely, an operation of measuring a reception signal strength of a radio signal when an operation command is set by the operation controller 100.

The timer 400 repeatedly performs a counting operation of a time interval (this time interval is called an intermittent reception time) of an intermittent reception operation as described later, and whenever a counting operation is completed, the timer 400 outputs a start-up signal to the operation controller 100.

When the fire detection unit 500 detects a fire, for example, by detecting smoke, heat, a spark or the like that is generated due to a fire, it activates the operation controller 100 which is in a sleep state, and outputs a fire detection signal to the operation controller 100. Further, a detailed configuration of the fire detection unit 500 is well known, so a detailed description thereof will be omitted.

The alarm unit 600 outputs a fire alarm (hereinafter, referred to as an 'alarm sound') by a sound (a buzzer sound, a voice message or the like) from a speaker (not shown), thus notifying ambient people of the outbreak of a fire.

The battery power unit 700 supplies each part with operation power by using, as a power source, a battery such as a dry cell or the like.

The operation controller 100 includes a microcomputer (not shown) or a memory unit 100a (e.g., a rewritable non-volatile semiconductor memory) as main components. The operation controller 100 performs various functions as described later by executing programs stored in a memory (ROM, EEPROM or the like) (not shown) by the microcomputer. Also, when a fire is not detected or when the intermittent reception operation is not executed by controlling the timer 400, the operation controller 100 may stop a transmission/reception operation of the wireless transceiver 200 to thereby save power and changes its operation state to a sleep state consuming low power.

When the fire detection unit 500 detects a fire while the operation state of the operation controller 100 is in the sleep state, the fire detection unit 500 outputs a start-up signal to the operation controller 100 to activate the operation controller 100. Being activated from the sleep state, the operation controller 100 performs a notification operation by using, e.g., a buzzer provided in the alarm unit 600 based on the fire detection signal inputted from the fire detection unit 500. Further, instead of buzzing sound, the operation controller 100 may output a voice message (e.g. 'fire broke out', etc.) previously stored in a memory (or the memory unit 100a) through the speaker to thus execute a notification operation.

Furthermore, in order for a different fire alarm TR to perform the notification operation in cooperation, the operation controller 100 transmits a radio signal including fire notification information notifying the outbreak of fire from the wireless transmission/reception unit 200. In the different fire alarm TR, when the operation controller 100 receives the fire notification information included in the radio signal through the wireless transmission/reception unit 200, the operation controller 100 controls the alarm unit 600 to perform a notification operation. Herein, a unique identification code is assigned to each fire alarm TRn, and is stored in the memory unit 1a, so a destination of a radio signal and a source fire alarm TRn (an origin of fire) thereof can be specified by using the identification code.

Here, the operation controller 100 is constituted by a low power consuming microcontroller which is driven by, e.g., a battery, and this type of microcontroller may be, e.g., MSP4340 (Registered Trademark) available from Texas Instruments Inc. Alternatively, there is disclosed ASIC for communications as a single chip in which an intermittent reception function is provided by timer function or wireless transmission/reception unit according to a particular small power wireless communications station. Such ASIC is available from, e.g., ML7066 of OKI Semiconductor Co., Ltd. or the like, and the wireless transmission/reception unit 200, the radio level measuring unit 300, or the timer 4 is realized by using such ASIC.

The operation controller 100 is powered by the battery power unit 700, and reduces power consumption to thereby lengthen a life span of the battery. That is, except for the case of fire detection, an operation state of the operation controller 100 is shifted to a sleep state and the wireless transmission/reception unit 200 also stops a transmission/reception operation. Also, in order to receive a radio signal transmitted from the different fire alarm TR, the operation controller 100 is activated to check whether or not a desired radio wave (a radio signal transmitted from the different fire alarm TR) can be received (intermittent reception) whenever a certain intermittent reception time has lapsed.

When a desired radio wave can be received in the intermittent reception, the operation controller 100 controls the wireless transmission/reception unit 200 to continue a reception operation, and analyzes a signal received by the wireless transmission/reception unit 200. On the other hand, when it is not received in the intermittent reception, the operation controller 100 immediately stops the reception operation of the wireless transmission/reception unit 200 and enters a standby state. Further, checking of radio wave reception is executed by the radio level measuring unit 300 based on a received signal strength indication (RSSI) signal outputted from the wireless transmission/reception unit 200. Here, the RSSI signal is a DC voltage signal proportional to a magnitude of a received signal strength.

For example, 'Radio facility of wireless communications station of small power security system' in Paragraph 17, Article 49 of radio facility regulations of enforcement regulation, Japan Radio Law, provides that the emission of a radio wave should be terminated within three seconds after the radio wave is emitted, and a radio wave cannot be emitted until two seconds have been lapsed therefrom (see Paragraph 5 of the same Article).

That is, it is prescribed that a time period for which a radio wave is transmitted is within three seconds and a pause period of at least two seconds after a transmission is provided. Thus, each fire alarm TR finishes transmission within the transmission time period in conformity with the radio facility regulation, stops transmission during the pause period and is switched to a reception available state. Here, the intermittent reception time, which is a time interval of the intermittent reception operation, is set to be longer than the transmission time (within three seconds) prescribed in the radio facility regulation.

Next, the intermittent reception operation will be described in detail with reference to a flow chart of FIG. 7. Before entering the sleep state, the operation controller 100 sets an intermittent reception time in the timer 400, starts a counting operation (step S1) and then enters the sleep state (step S2). When the timer 400 completes the counting operation (counts up) of the intermittent reception time (Yes in step S3), the timer 400 outputs a start-up signal to the operation controller 100 to activate the operation controller 100 from the sleep state (step S4). Being activated from the sleep state, the operation controller 100 sets an operation command in each of the wireless transmission/reception unit 200 and the radio level measuring unit 300 (step S5), and shifts to the sleep state (step S6) until a measuring operation by the radio level measuring unit 300 is completed.

When an operation command is set by the operation controller 100, the wireless transmission/reception unit 200 autonomously executes a reception operation (step S7). Also, when the operation command is set by the operation controller 100, the radio level measuring unit 300 autonomously executes an operation of measuring a received signal strength of the signal received by the wireless transmission/reception unit 200 (step S8). When the radio level measuring unit 300 completes the measuring operation, it outputs a start-up signal to the operation controller 100 to activate the operation controller 100 from the sleep state (step S9). Activating from the sleep state, the operation controller 100 obtains the measurement result of the received signal strength from the radio level measuring unit 300, and compares the measurement result of the received signal strength with a certain reference value (step S10). Here, the reference value is set to be a value which is higher than a received signal strength in a state in which a radio signal is not transmitted from another fire alarm TR, and lower than a received signal strength in a state in which a radio signal is transmitted from another fire alarm TR.

When the measurement result of the received signal strength is equal to or greater than the reference value (Yes in step S10), the operation controller 100 determines that a radio signal is transmitted from the other fire alarm TR, controls the wireless transmission/reception unit 200 to continue the reception operation (step S11), and analyzes the received signal (step S12). When the received signal includes fire notification information, the operation controller 100 controls the alarm unit 600 to perform the above-described alarming operation based on the fire notification information, and executes a notification operation by cooperating with the fire alarm TR at the origin of the fire (step S13).

When the measurement result of the received signal strength is smaller than the reference value (No in step S10), the operation controller 100 determines that a radio signal is not transmitted from the other fire alarm TR and stops the reception operation of the wireless transmission/reception unit 200 (step S14). Thereafter, the operation controller 100 is returned to the operation of step S1, sets the intermittent reception time in the timer 400 to start a counting operation, and shifts to a sleep state until the timer 4 counts up the intermittent reception time (step S2).

As described above, in case of the intermittent reception, when the operation controller 100 is activated upon receiving a start-up signal from the timer 400, the operation controller 100 sets an operation command in the wireless transmission/reception unit 200 and the radio level measuring unit 300, and shifts to the sleep state. Thus, while the wireless transmission/reception unit 200 executes a reception operation and the radio level measuring unit 300 measures the received signal strength, the operation controller 100 is shifted to the sleep state, so power consumption in the operation controller 100 can be further reduced.

Accordingly, if the wireless station (the fire alarm TR) is driven by a battery, a life span of the battery can be lengthened and a replacement cycle of the battery can be lengthened, thereby reducing the burden of a maintenance operation. Also, the wireless transmission/reception unit 200 and the radio level measuring unit 300 autonomously operates when an operation command is set by the operation controller 100, and the wireless transmission/reception unit 200 continue to perform reception operation when the received signal strength is equal to or greater than a reference value. Thus, it is possible to reliably receive a radio signal transmitted from another wireless station (the fire alarm TR).

Further, in the present embodiment, in case of the intermittent reception, when the radio level measuring unit 300 completes measurement of a received signal strength, the radio level measuring unit 300 activates the operation controller 100 from a sleep state and the operation controller 100 determines whether or not there is a reception signal based on the measurement result of the received signal strength. Thus, in case of the intermittent reception, since the operation controller 100 is in the sleep state between a time at which the operation command is set in the wireless transmission/reception unit 200 and the radio level measuring unit 300 and a time at which the measurement of the received signal strength is completed, power consumption by the operation controller 100 can be reduced in the corresponding time duration.

Further, the operation controller 100 compares the received signal strength measured by the radio level measuring unit 300 with the reference value. In the present embodiment, when the measurement result of the received signal strength is equal to or greater than the reference value, the operation controller 100 continues the reception operation of the wireless transmission/reception unit 200 and executes analyzation of the reception signal, thereby reliably receiving a radio signal from another fire alarm TR. Also, when the received signal strength is smaller than the reference value, the operation controller 100 stops the reception operation of the wireless transmission/reception unit 200, thus reducing power consumption of the wireless transmission/reception unit 200.

Further, in a wireless communication system including a plurality of fire alarms TR, a particular fire alarm TR1 (hereinafter, referred to as a 'master station') periodically monitors to check whether or not the other fire alarms TR2~TRn (hereinafter, referred to as a 'slave station') normally operates. That is, in the fire alarm TR1 as a master station, the operation controller 100 periodically (e.g., at every 24 hours) activates the wireless transmission/reception unit 200 and transmits a radio signal including a periodic monitoring message to the slave stations.

In each of the slave stations TR2~TRn, the operation controller 100 monitors whether or not the fire detection unit 500 is out of order and whether or not remaining capacity of the battery power unit 700 is lowered periodically (e.g., at every one hour) and stores the monitoring results (device error and lowering of the remaining capacity) in the memory unit 100a. Further, when the operation controller 100 of each of the slave stations TR2~TRn receives the periodic monitoring message from the master station TR1, it transmits a radio signal including fire notification information for notifying the monitoring results stored in the memory unit 100a to the master station TR1.

After the operation controller 100 of the master station TR1 transmits the radio signal including the periodic monitoring message, it switches the wireless transmission/reception unit 200 to a reception state and receives radio signals transmitted from the respective slave stations TR2~TRn. Further, when there is any slave station TR2, . . . which does not return fire notification information within a certain time period after the periodic monitoring message is transmitted, the operation controller 100 of the master station TR1 controls the alarm unit 600 to notify a fault of the slave station TR2, . . . (communications error).

Further, when fire notification information including a fault occurrence or lowered remaining capacity of a battery is returned from any slave station TR2, . . . , the operation controller 100 of the master station TR1 controls the alarm unit 600 to notify a fault (generation of breakdown, a lowered remaining capacity of battery, etc.) of the slave station TR2, . . . . Also, when a breakdown of the fire detection unit 500 or a lowered remaining capacity of the battery is detected, the operation controller 100 of each of the master station TR1 and the slave station TR2, . . . immediately drives the alarm units 600 to notify the occurrence of the fault, respectively.

Further, after the operation controller 100 of the master station TR1 transmits a radio signal including fire notification information from the wireless transmission/reception unit 200 when detecting a fire, or receives a radio signal including fire notification information from another slave station TR2, . . . , it transmits a synchronization beacon at a time period from the wireless transmission/reception unit 200. The synchronization beacon is a signal defining a time slot required for performing wireless communications (hereinafter, referred to as 'synchronization communication') based on time division multiple access (TDMA) among multiple fire alarms TR.

One period of the synchronization beacon is divided into multiple time slots so that each of the time slots is allocated to each of the slave stations TR2, . . . . And, a message from the master station TR1 to the slave station TR2, . . . is included in the synchronization beacon and transmitted, so a radio signal including a message from the slave stations TR2, . . . to the master station TR1 is carried in the time slot allocated to each slave station and transmitted. Thus, a collision between the radio signals transmitted from the fire alarms TR (the master station TR1 and the slave stations TR2, . . . ) can be reliably prevented. Also, the allocation of the time slots to the respective fire alarms TR may be fixed, or allocation information of the time slots may be notified to the respective slave stations TR2, . . . through the synchronization beacon transmitted from the master station TR1.

(Modified Embodiment of Second Embodiment)

A modified embodiment of the wireless communication system in accordance with the second embodiment will be described with reference to FIG. 8. In the second embodiment, in case of intermittent reception, when the radio level measuring unit 300 completes measuring of a received signal strength, the radio level measuring unit 300 activates the operation controller 100 from the sleep state, such that the operation controller 100 compares the measurement result of the received signal strength with the reference value. In case of intermittent reception of the present modified embodiment, when the radio level measuring unit 300 completes measuring of a received signal strength, the radio level measuring unit 300 compares the measurement result of the received signal strength with the reference value.

Further, only when the measurement result of the received signal strength is equal to or greater than the reference value, the radio level measuring unit 300 activates the operation controller 100 from the sleep state to analyze the reception signal. When the measurement result of the received signal strength is smaller than the reference value, the radio level measuring unit 300 does not activate the operation controller 100 and the operation controller 100 is maintained in the sleep state until the timer 400 completes counting. Also, the configuration of the system of the present example is the same as that of the second embodiment, so the same reference numerals are used for the same or similar components and a description thereof will be omitted.

Figure 8:
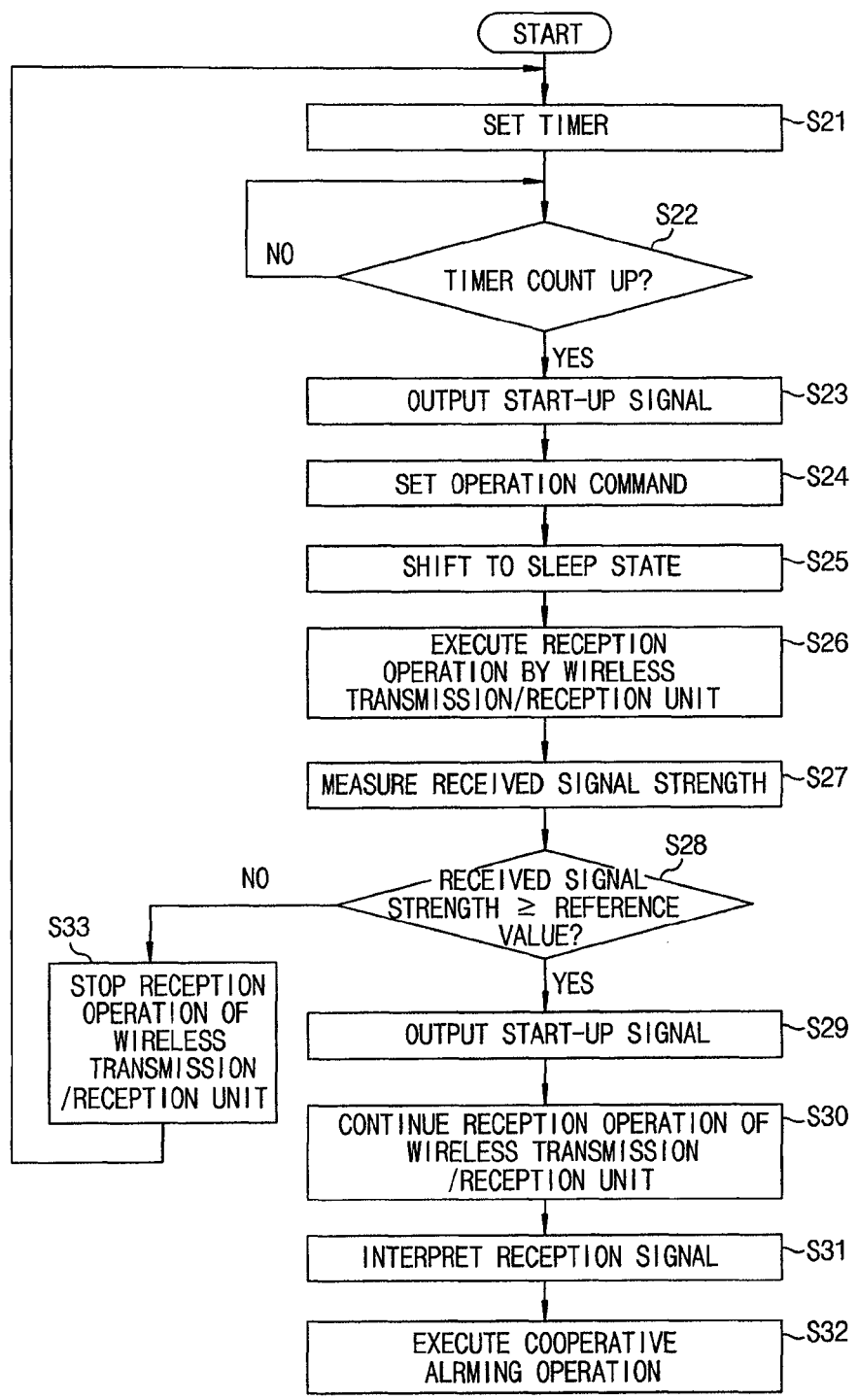
FIG. 8 is a flow chart for explaining an intermittent reception operation of the fire alarm in accordance with a modification of the second embodiment.

FIG. 8 is a flow chart illustrating an operation of intermittent reception, and an operation of the present example will be described based on the flow chart.

Before shifting to the sleep state, the operation controller 100 sets an intermittent reception time period in the timer 400, starts a counting operation by the timer 400 (step S21) and then shifts to the sleep state.

When the timer 400 completes the counting (Yes in step S22), a start-up signal is outputted to the operation controller 100 from the timer 400 to activate the operation controller 100 from the sleep state (step S23). Being activated from the sleep state, the operation controller 100 sets an operation command in each of the wireless transmission/reception unit 200 and the radio level measuring unit 300 (step S24), and then shifts to the sleep state (step S25).

When the operation command is set by the operation controller 100, the transmission/reception unit 200 autonomously executes a reception operation (step S26). Further, when the operation command is set by the operation controller 100, the radio level measuring unit 300 autonomously executes an operation of measuring a received signal strength of the signal received by the wireless transmission/reception unit 200 (step S27). When the radio level measuring unit 300 measures a received signal strength, it compares the measurement result of the received signal strength with a reference value (step S28).

When the measurement result of the received signal strength is equal to or greater than the reference value in step S28 (Yes in step S28), the radio level measuring unit 300 determines that a radio signal is transmitted from another fire alarm TR, and outputs a start-up signal to the operation controller 100 (step S29). Starting up from the sleep state, the operation controller 100 controls the wireless transmission/reception unit 200 to continue the reception operation depending on the start-up signal from the radio level measuring unit 300 (step S30), and analyzes a received signal from the wireless transmission/reception unit 200 (step S31). When the received signal includes fire notification information, the operation controller 100 controls the alarm unit 600 to perform the alarming operation as described earlier in the second embodiment based on the fire notification information, and executes a notification operation by cooperating with the fire alarm TR at the origin of the fire (step S32).

On the other hand, when the measurement result of the received signal strength is smaller than the reference value in step S28 (No in step S28), the radio level measuring unit 300 determines that a radio signal is not transmitted from another fire alarm TR and stops the reception operation of the wireless transmission/reception unit 200 (step S33). Thereafter, the radio level measuring unit 300 is returned to step S1, sets the intermittent reception time period in the timer 400 to start a counting operation and then repeats the operations after step S2.

As described above, the operation controller 100 sets an operation command in the wireless transmission/reception unit 200 and the radio level measuring unit 300, and shifts to the sleep state, in case of the intermittent reception. Accordingly, the wireless transmission/reception unit 200 and the radio level measuring unit 300 autonomously perform an operation, respectively. That is, the radio level measuring unit 300 compares the measurement result of the received signal strength with a reference value and determines whether or not there is a reception signal based on the comparison result.

When the measurement result of the received signal strength is equal to or greater than the reference value, the radio level measuring unit 300 activates the operation controller 100 and the operation controller 100 analyzes the received signal received by the wireless transmission/reception unit 200, thereby reliably receiving a radio signal from another fire alarm TR. Further, when the measurement result of the received signal strength is smaller than the reference value, the radio level measuring unit 300 stops the reception operation of the wireless transmission/reception unit 200, thereby reducing power consumption of the wireless transmission/reception unit 200.

In addition, since the radio level measuring unit 300 does not activate the operation controller 100 and the operation controller 100 is maintained in the sleep state until the timer 400 completes the counting, power consumption of the operation controller 100 can be further reduced. Thus, when the wireless station (the fire alarm TR) is driven by a battery, a life span of the battery can be lengthened and the replacement cycle of the battery can be lengthened, and thus, the burden of a maintenance operation can be reduced.

Figure 9:
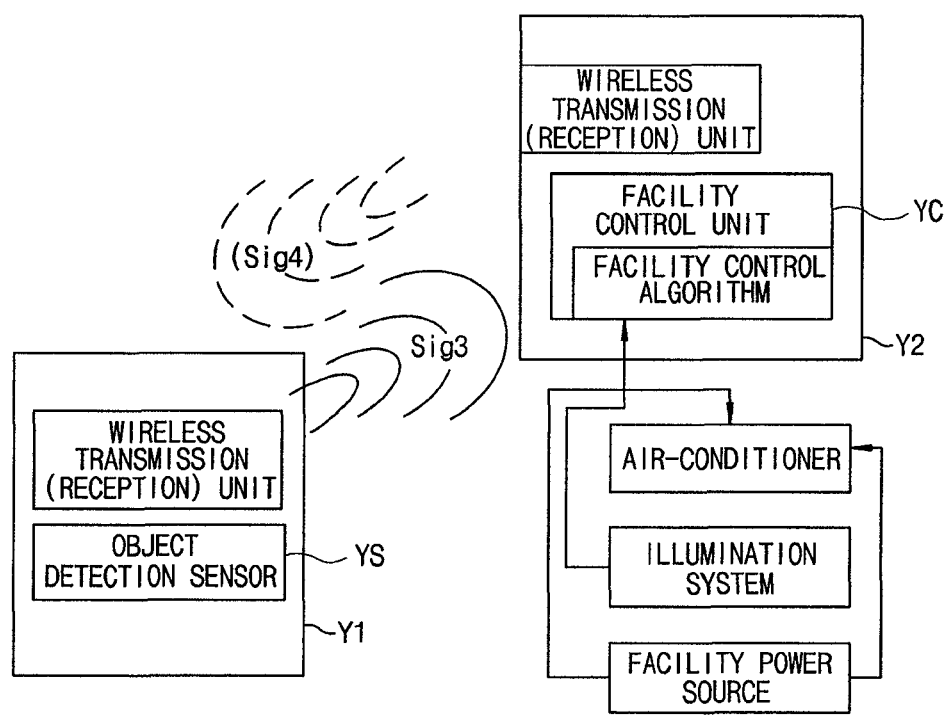
FIG. 9 is a view showing configuration of a facility control system using the wireless transceiver in accordance with the first embodiment.

Although the wireless transceiver in accordance with the present invention is applied in the wireless communication system including the wireless communication device group in the above embodiments, the wireless transceiver in accordance with the present invention may be applied to a wireless transmitter Y1 and a wireless receiver Y2 of a wireless remote control system as illustrated in FIG. 9. In addition to transmission function of the wireless transceiver of the embodiments as described above, the wireless transmitter Y1 includes an object detection sensor YS capable of detecting the presence of an object such as a human body, an obstacle or the like in proximity by a manipulation input detection sensor, a pressure sensor or the like in a contact manner, or by a manual detection sensor based on heat, light, or vibration in a contactless manner.

Besides the reception function of the foregoing wireless transceiver, the wireless receiver Y2 also includes a facility control unit YC for executing a remote communications with an air-conditioner, an illumination system, or a facility equipment such as a facility power source which is responsible for controlling an environment of a particular location, without interfering wireless communications with the wireless transmitter Y1. A signal transmission between the facility control unit YC and the facility equipment may be a wired transmission or a wireless transmission.

Accordingly, when the wireless transmitter detects the presence of an object such as a human body, an obstacle or the like therearound by the object detection sensor YS, the wireless transmitter transmits a radio signal Sig3 representing an event detected by the object detection sensor YS, to the wireless receiver Y2 through the wireless transceiver. When the wireless receiver Y2 receives the radio signal Sig3, it determines a lighting system or the like) previously provided in the facility control unit YC, a target facility equipment to be driven among a facility equipment group including the air-conditioner, the lighting system and the facility power source, and an operation mode thereof based on the contents of the received radio signal Sig3, and remotely controls the target facility equipment based on the determination results, by executing a facility control algorithm (which may just turn ON or OFF facility equipments such as an air-conditioner.

In this case, the wireless receiver Y2 may transmit to the wireless transmitter Y1 a signal Sig4 as an answer back (which is good in a so-called ACK signal) representing that the radio signal Sig3 is successfully received or the contents thereof is analyzed, from the wireless transceiver of the wireless receiver Y2 itself. Herein, each of the wireless transmitter Y1 and the wireless receiver Y2 is required to have a wireless transmission function and a wireless reception function. The wireless transceiver in accordance with the present invention is capable of handling different radio frequencies for transmission and reception, and thus, it can be preferably used.

Third Embodiment

Figure 10:
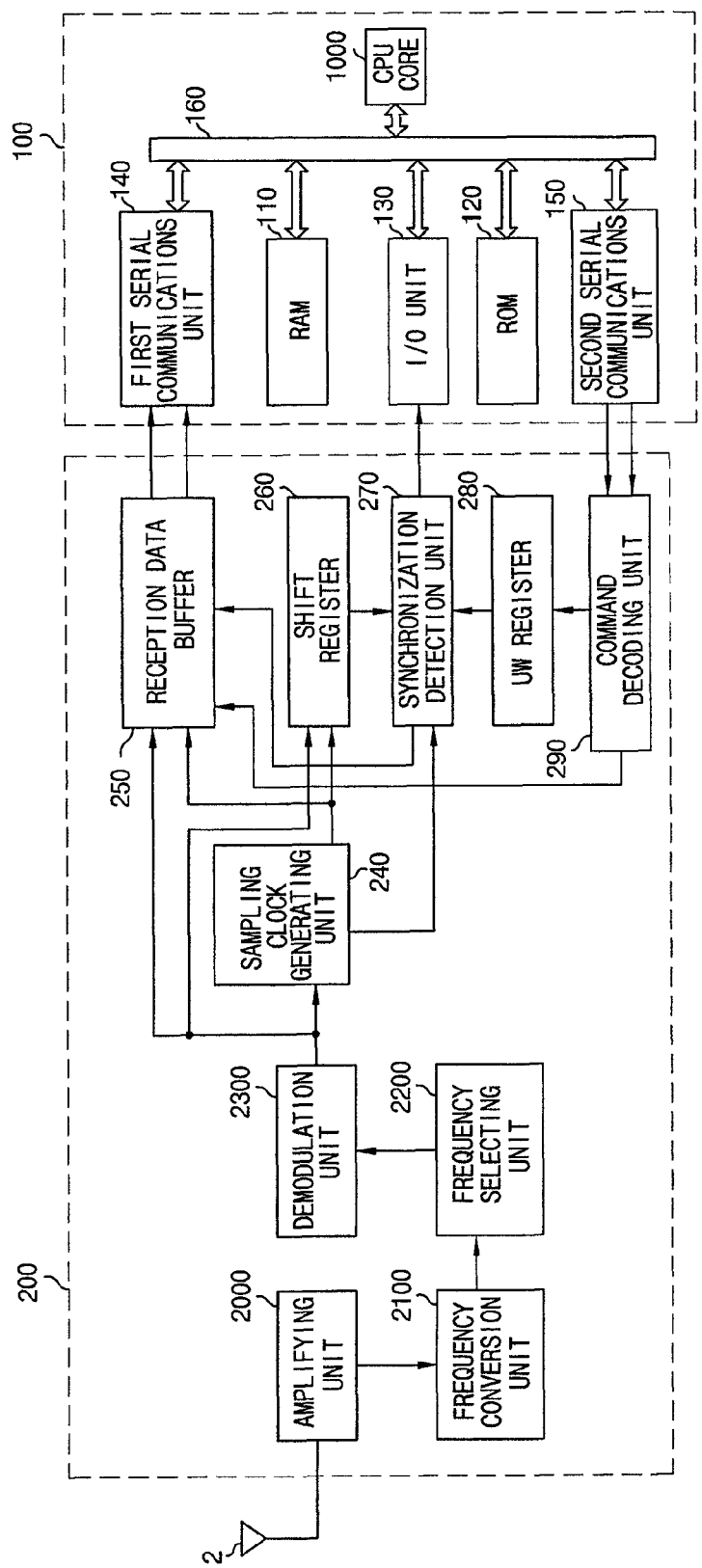
FIG. 10 is a block diagram of major parts of a wireless communication system in accordance with a third embodiment of the present invention.

Next, a third embodiment in accordance with the present invention will be described in detail with reference to FIGS. 10 to 15. As shown in FIG. 10, a wireless communication system of the third embodiment includes a wireless transmission/reception unit 200 for processing a radio signal received via the antenna 2 to convert it into a bit stream of a pulse signal, and an operation controller 100 for obtaining information (data) included in the radio signal from the bit stream outputted from the wireless transmission/reception unit 200. Also, like the conventional example, a communications frame of the radio signal is configured to include in a synchronization bit stream (preamble) for bit synchronization, a frame synchronization bit stream (unique word) for frame synchronization, data corresponding to the information, a check code (e.g., CRC) for error detection, and the like.

The wireless transmission/reception unit 200 includes an amplifying unit 2000 (which corresponds to the LNA 4 in FIG. 1), a frequency conversion unit 2100 (which corresponds to the mixer 5 in FIG. 1), a frequency selecting unit 2200 (which corresponds to the IF filter 6 and the IF amplifier 7 in FIG. 1), a demodulation unit 2300, a sampling clock generating unit 240, a reception data buffer 250, a shift register 260, a frame synchronization detection unit (hereinafter, referred to as a 'synchronization detection unit') 270, a unique word (UW) register 280, and a command processing (command decoding) unit 290. In the present embodiment, the wireless transmission/reception unit 200 is provided as a large-scale integration circuit (LSI) in which the respective parts are integrated in a single chip.

The radio signal received by the antenna 2 is amplified by the amplifying unit 2000, and then converted into IF lower than RF by the frequency conversion unit 2100. The frequency conversion unit 2100 includes a local oscillator (not shown) for oscillating a signal having a local oscillation frequency which is the same as a frequency of a difference between the RF and the IF, and a frequency adjustment unit (not shown) for controlling a frequency deviation in the local oscillator.

In a general wireless communication system, when a frequency deviation occurs in the local oscillator, a reference frequency is not settled due to a remaining frequency error caused by the frequency offset, and the frequency error may cause erroneous demodulation when a frequency-modulated radio signal is demodulated. To cope with this, there is provided a function of correcting the frequency deviation of the local oscillator to automatically cancel an influence of the frequency deviation, that is, a function, which is a so-called auto frequency control (AFC).

In the present embodiment, the frequency control circuit is provided in the frequency conversion unit 2100 to realize the automatic frequency control function. This frequency control circuit controls a frequency by controlling a frequency synthesizer (e.g., a frequency synthesizer using a fractional PLL circuit) provided in the local oscillator. Further, the frequency conversion unit 2100 is well known, so a description of a detailed configuration and operation thereof will be omitted.

The frequency selecting unit 2200 includes a band pass filter to select only a signal component (reception signal) having a desired frequency band from an IF signal which is frequency-converted by the frequency conversion unit 2100, and output the same. The reception signal is demodulated into a demodulation signal (baseband signal) by the demodulation unit 2300. The sampling clock generating unit 240 generates a sampling clock, adjusts a phase of the sampling clock such that the demodulation signal can be sampled in the middle of rising and falling of the demodulation signal, and outputs the same. Further, the demodulation signal is sampled in synchronization with the sampling clock and, at the same time, the sampled bit stream (reception data) is stored in the shift register 260. The shift register 260 has a capacity having bits equal to the number of bits of the unique word.

The synchronization detection unit 270 compares the reception data stored in the shift register 260 and the unique word stored in the UW register 280. When the bit streams of the both are identical, the synchronization detection unit 270 determines that they are synchronized, and outputs a frame synchronization detection signal (having a high (H) level). Further, the unique word previously designated by the operation controller 100 is stored in the UW register 180.

In the meantime, the sampling clock generating unit 240 continuously monitors rising and falling of the demodulation signal, and the sampling clock generating unit 240 determines that the bit synchronization is deviated when timings of rising and falling are rapidly changed, and outputs a synchronization deviation signal to the synchronization detection unit 270. When the synchronization detection unit 270 receives the synchronization deviation signal from the sampling clock generating unit 240, it stops outputting of the frame synchronization detection signal (turning into a low (L) level).

When the synchronization detection unit 270 starts to output the frame synchronization detection signal (rising from the L level to the H level), the reception data buffer 250 samples the demodulation signal in synchronization with the sampling clock and accumulates the sampled bit streams (reception data).

Meanwhile, the operation controller 100 includes a central processing unit (CPU) 1000, a RAM 110, a ROM 120, an I/O unit 130, a first serial communication unit 140, a second serial communication unit 150, a data bus 160, and the like. The CPU 1000 performs various processes as described later by executing programs stored in the ROM 120. The I/O unit 130 detects rising and rising of the frame synchronization detection signal outputted from the synchronization detection unit 270 of the wireless transmission/reception unit 200, and informs the CPU 1000 of a rising interruption and a falling interruption through the data bus 160. When a rising interruption is notified by the I/O unit 130, the CPU 1000 starts a rising edge interruption process and sends a reception data output command to the second serial communication unit 150 through the data bus 160. Further, the second serial communication unit 150 transmits the reception data output command applied from the CPU 1000 to the command decoding unit 290 of the wireless transmission/reception unit 200.

The command decoding unit 290 decodes the reception data output command received from the second serial communication unit 150 and outputs the same to the reception data buffer 250. When the reception data buffer 250 receives the reception data output command from the command decoding unit 290, it transmits reception data (bit stream) accumulated in the reception data buffer 250 and the sampling clock inputted from the sampling clock generating unit 240, to the first serial communication unit 140 of the operation controller 100.

The first serial communication unit 140 transmits the reception data and the sampling clock received from the reception data buffer 250 of the wireless transmission/reception unit 200 to the CPU 1000 through the data bus 160. The CPU 1000 decodes the reception data transmitted from the first serial communication unit 140 to obtain information (message) included in the radio signal, and executes various processes based on the obtained information. Further, when the CPU 1000 obtains information (message) having a prescribed length (which corresponds to one frame), it issues a reset command to the second serial communication unit 150 through the data bus 160. Furthermore, the second serial communication unit 150 transmits the reset command applied from the CPU 1000 to the command decoding unit 290 of the wireless transmission/reception unit 200.

The command decoding unit 290 decodes the reset command received from the second serial communication unit 150 and outputs the same to the sampling clock generating unit 240 and the synchronization detection unit 270. When the sampling clock generating unit 240 receives the reset command, it stops generating of the sampling clock and is returned to an initial state. Similarly, when the synchronization detection unit 270 receives the reset command, it stops outputting of the frame synchronization detection signal and is returned to an initial state. In the present embodiment, the I/O unit 130, and the first and second serial communication units 140 and 150 are equivalent to an interface unit.

By the way, even in the wireless communication system in accordance with the third embodiment of the present invention like the conventional example, the demodulation unit 2300 of the wireless transmission/reception unit 200 may output a signal formed of a random bit stream due to an influence of thermal noise or radio wave noise although a radio signal is not received by the antenna 2. In this case, the same bit stream as that of the unique word may be contained in the random bit stream and, accordingly, the synchronization detection unit 270 erroneously detects frame synchronization and outputs a frame synchronization detection signal. Further, the CPU 1000 of the operation controller 100 starts rising edge interruption process in synchronization with rising of the frame synchronization detection signal, and transmits a reception data output command through the second serial communication unit 150. Accordingly, the reception data and the sampling clock are transmitted from the reception data buffer 250 of the wireless transmission/reception unit 200, and the CPU 1000 executes decoding of the reception data.

Here, the sampling clock generating unit 240 of the wireless transmission/reception unit 200 continuously monitors a bit stream of the demodulation signal demodulated by the demodulation unit 2300. Since a bit width (pulse width) of the random bit stream is not uniform, the sampling clock generating unit 240 determines that there is a synchronization deviation not before long and stops outputting of the sampling clock. When outputting of the sampling clock is stopped, the synchronization detection unit 270 also stops outputting of the frame synchronization detection signal. Further, when the outputting of the frame synchronization detection signal is stopped (falling from the H level to the L level) before a bit stream having a prescribed length is received from the reception data buffer 250, the CPU 1000 of the operation controller 100 starts falling edge interruption process to cancel the data (bit stream) received from the reception data buffer 250 and to output a reset command.

As described above, in the conventional example, if a normal radio signal is received immediately after an erroneous synchronization occurs due to thermal noise or radio wave noise, there is a possibility that the radio signal cannot be received normally. However, in the wireless communication system of the third embodiment, even when the regular radio signal is received immediately after erroneous synchronization occurs due to the thermal noise or the radio wave noise, the normal radio signal can be reliably received.

Figure 11:
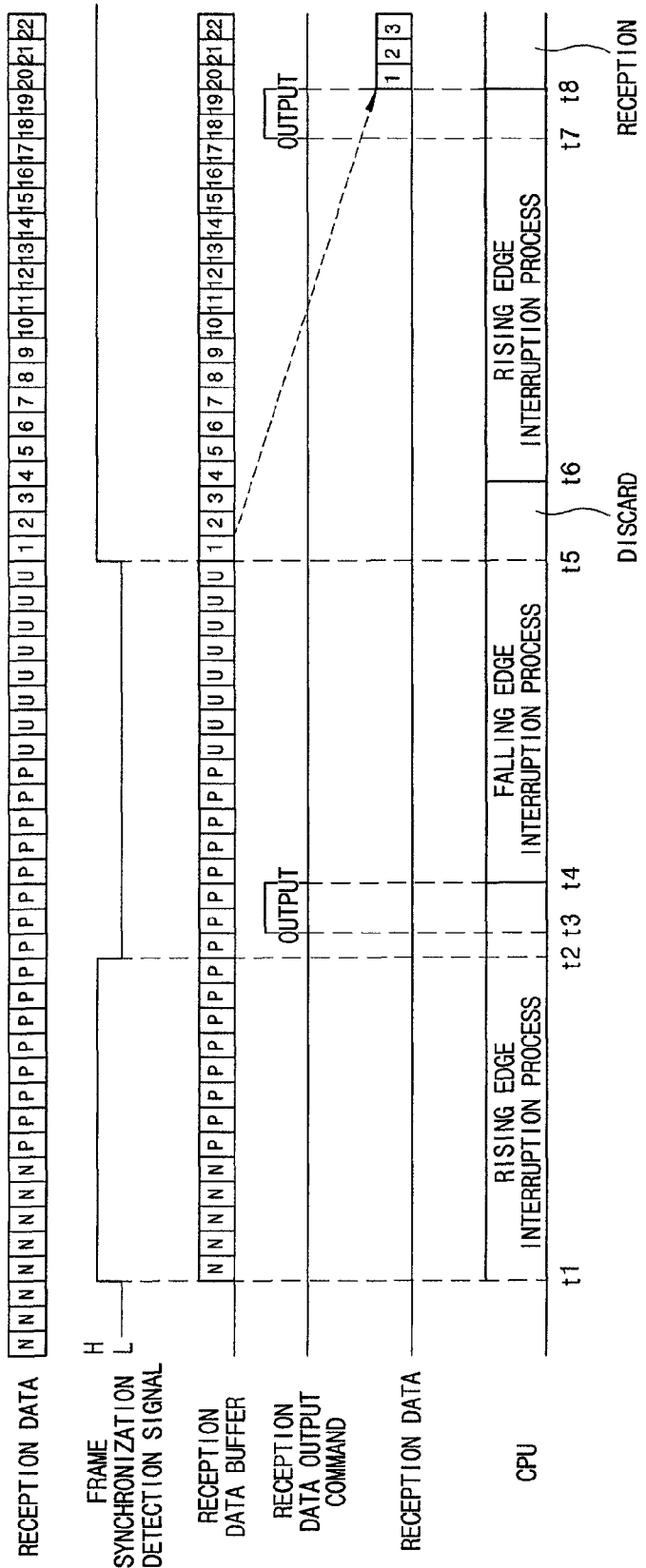
FIGS. 11 to 14 are time charts for explaining the operation of the third embodiment of the present invention.

Hereinafter, an operation of the wireless communication system of the third embodiment in case where a normal radio signal is received immediately after erroneous synchronization occurs due to thermal noise or radio wave noise and a synchronization deviation is shortly detected will be described in detail with reference to the time chart of FIG. 11. In FIG. 11, 'N' denotes noise, 'P' denotes a preamble, 'U' denotes a unique word, numbers '1', '2', ... indicate data, and 'output' represents a reception data output command.

Figure 18:
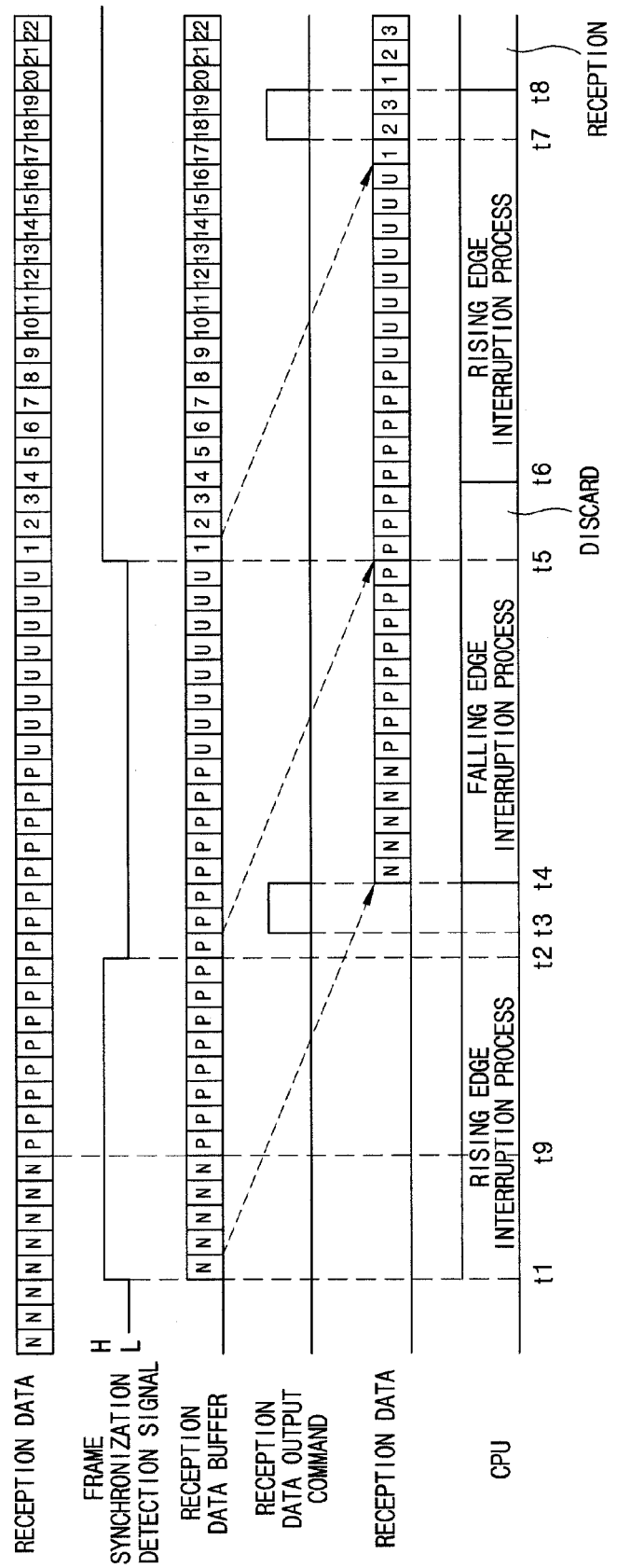

It is assumed that an error detection of synchronization occurs at the time t=t1 so a frame synchronization detection signal rises, the CPU 1000 of the operation controller 100 starts accordingly a rising edge interruption process, and a synchronization deviation is determined so the frame synchronization detection signal falls at the time t=t2 before the time t=t3 when a reception data output command is transmitted to the wireless transmission/reception unit 200 through the second serial communication unit 150 from the CPU 1000. In this case, in the conventional example, a control signal is outputted from the microcomputer 1300 before the frame synchronization detection signal falls, and the reception data is outputted to the microcomputer 1300 from the reception buffer 124 in synchronization with the falling of the control signal (see the time t=t4 in FIG. 18) although the synchronization deviation has been determined and the frame synchronization detection signal has fallen.

However, in the present embodiment, as shown in FIG. 10, the frame synchronization detection signal outputted from the synchronization detection unit 270 is also inputted to the command decoding unit 290, and the command decoding unit 290 performs a logical-AND operation of the reception data output command (the output signal in FIG. 1) and the frame synchronization detection signal. Further, only when the frame synchronization detection signal and the reception data output command all are inputted (when the both have the H level), the reception data output command is outputted to the reception data buffer 250. Thus, in FIG. 11, since the synchronization deviation occurs and the frame synchronization detection signal is stopped (having the L level) at the time t=t3 at which the command decoding unit 290 receives the reception data output command, the reception data output command is not outputted from the command decoding unit 290 and the reception data is not outputted from the reception data buffer 250.

Further, when the transmitting of the reception data output command is completed (time t=t4), the CPU 1000 starts a falling edge interruption process depending on a falling interruption from the I/O unit 130, and outputs a reset command. In this case, since the reception data is not outputted from the reception data buffer 250, the CPU 1000 is not required to discard the data received from the reception data buffer 250 in the falling edge interrupt process.

On the other hand, when a normal radio signal is received by the antenna 2 after the time t=t2 at which the synchronization deviation occurs and the frame synchronization detection signal rises (time t=t5), the CPU 1000 starts a rising edge interruption process in response to a rising interruption from the I/O unit 130 (time t=t6) and transmits a reception data output command through the second serial communication unit 150 to the command decoding unit 290 (time t=t7~t8). Since the frame synchronization detection signal is a High (H) level at the time point when the reception data output command (ACT signal) is received, the command decoding unit 290 outputs the reception data output command to the reception data buffer 250.

Further, when receiving the reception data output command, the reception data buffer 250 outputs the reception data and a sampling clock (time t=t8). Herein, the reception data buffer 250 starts to output the reception data from the time point when the reception data output command has been received, and the reception data is not outputted before the reception data output command is received, unlike the conventional example illustrated in FIG. 18. Thus, the first serial communication unit 140 of the operation controller 100 can receive sequentially the data accumulated in the reception data buffer 250 from the beginning data (i.e., '1').

In the wireless communication system in accordance with the present embodiment, if the command decoding unit 290 of the operation controller 100 does not receive a reception data output command until the synchronization detection unit 270 stops outputting of the frame synchronization detection signal after starting to output the frame synchronization detection signal, the reception data accumulated in the reception data buffer 250 is not outputted even though the reception data output command is outputted from the CPU 1000 of the operation controller. Thus, even immediately after the erroneous synchronization, a regular radio signal can be properly received as described above.

Further, in the present embodiment, the command decoding unit 290 performs logical-AND operation of the reception data output command and the frame synchronization detection signal and, when the frame synchronization detection signal and the reception data output command all are not inputted (i.e., when at least one of them is in a Low (L) level), the reception data output command is not outputted to the reception data buffer 250. This can be realized through the relatively simple configuration.

As described above, if the normal radio signal is received, erroneous synchronization can be shortly dissolved by detecting synchronization deviation. However, when erroneous synchronization occurs due to thermal noise or the like, there is a high possibility that a local oscillation frequency controlled by a frequency control circuit of the frequency conversion unit 2100 has been greatly deviated from a local oscillation frequency corresponding to the original radio signal (see 'AFC frequency' in FIG. 12).

Figure 12:
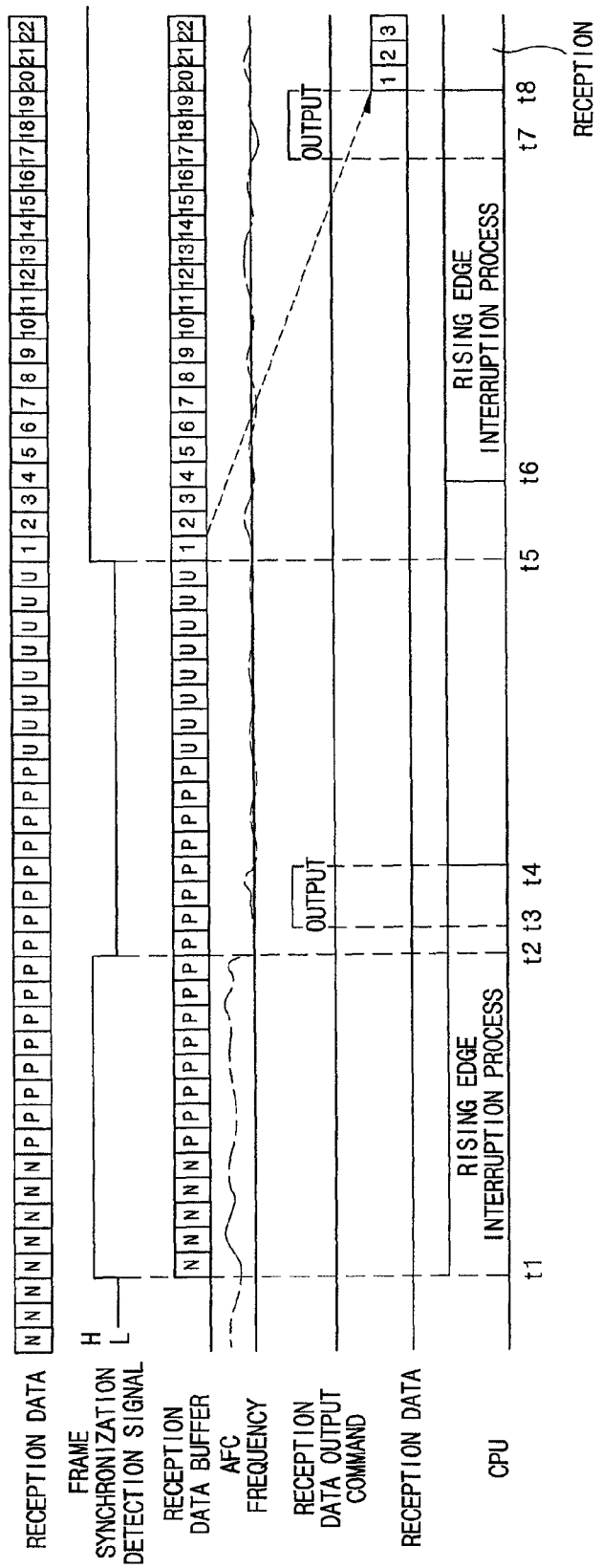

In this case, as shown in FIG. 12, it is possible to reduce a time required for the frequency control circuit to complete adjustment of the frequency deviation with respect to a normal radio signal by initialing an AFC frequency control for frequency deviation in the frequency control circuit of the frequency conversion unit 2100 of the wireless transmission/reception unit 200 at the time t=t2 when synchronization deviation is determined.

Figure 13:
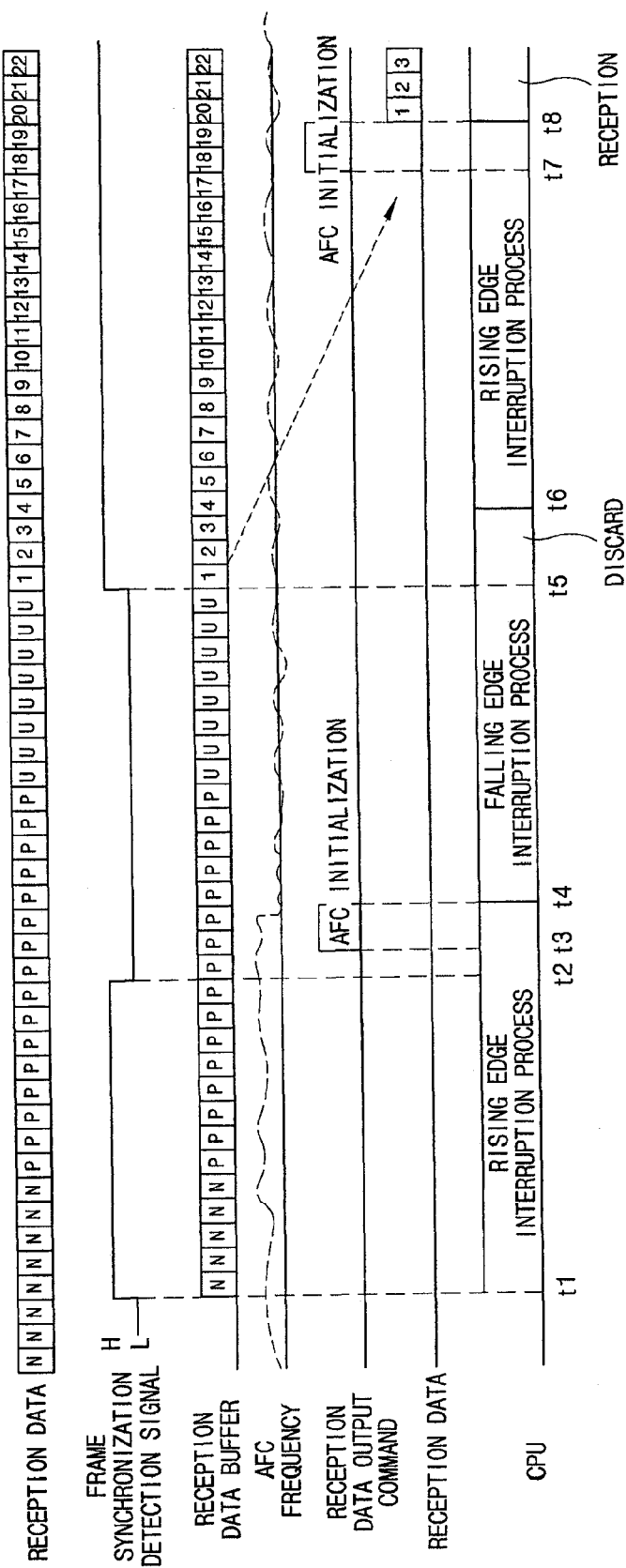

Alternatively, as shown in FIG. 13, when outputting of the frame synchronization detection signal is stopped at the time t=t4) when the reception data output command is outputted, the CPU 1000 may transmit an initialization command through the second serial communication unit 150 to initialize the AFC frequency for frequency deviation control of the frequency control circuit.

Figure 14:
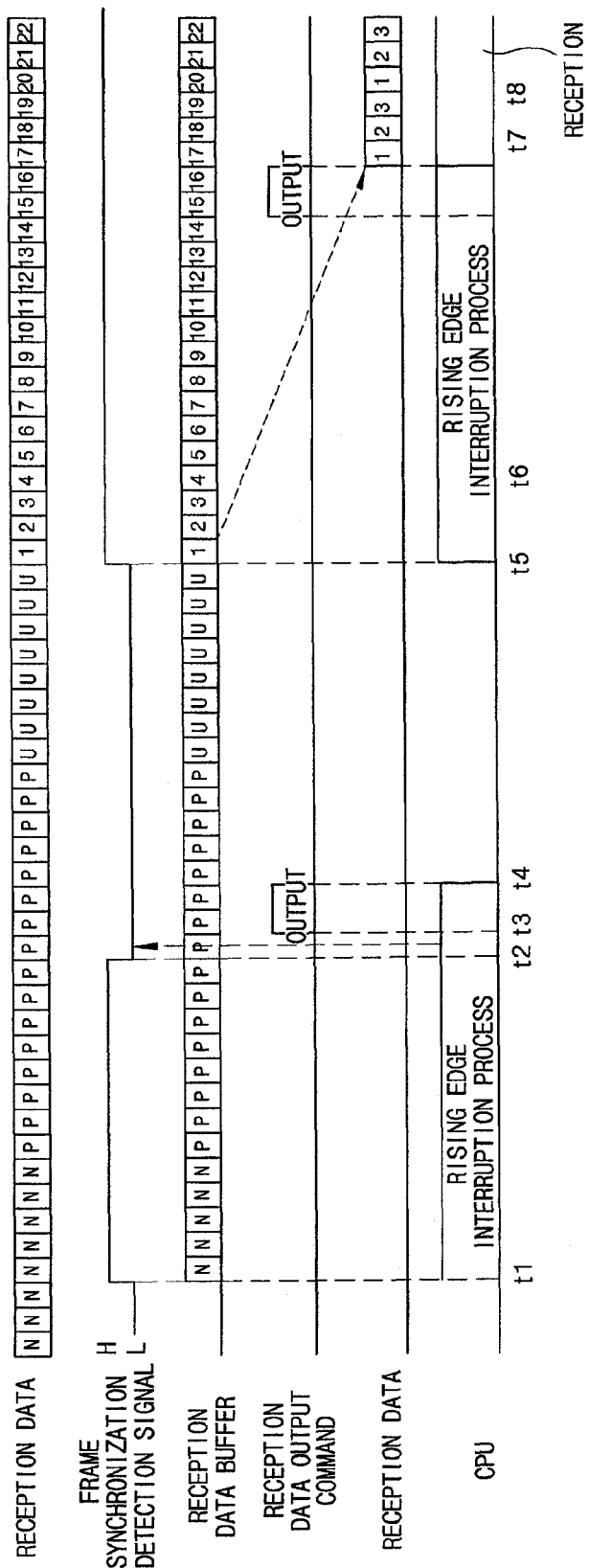
Figure 15:
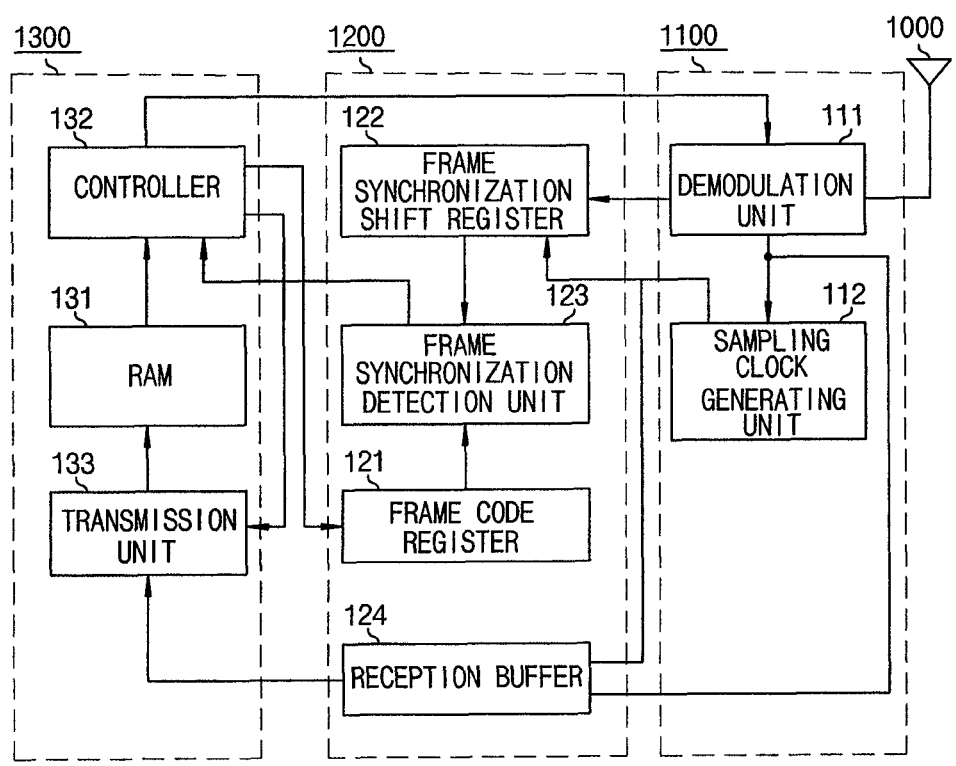
FIG. 15 is a block diagram showing a conventional example.
Figure 16:
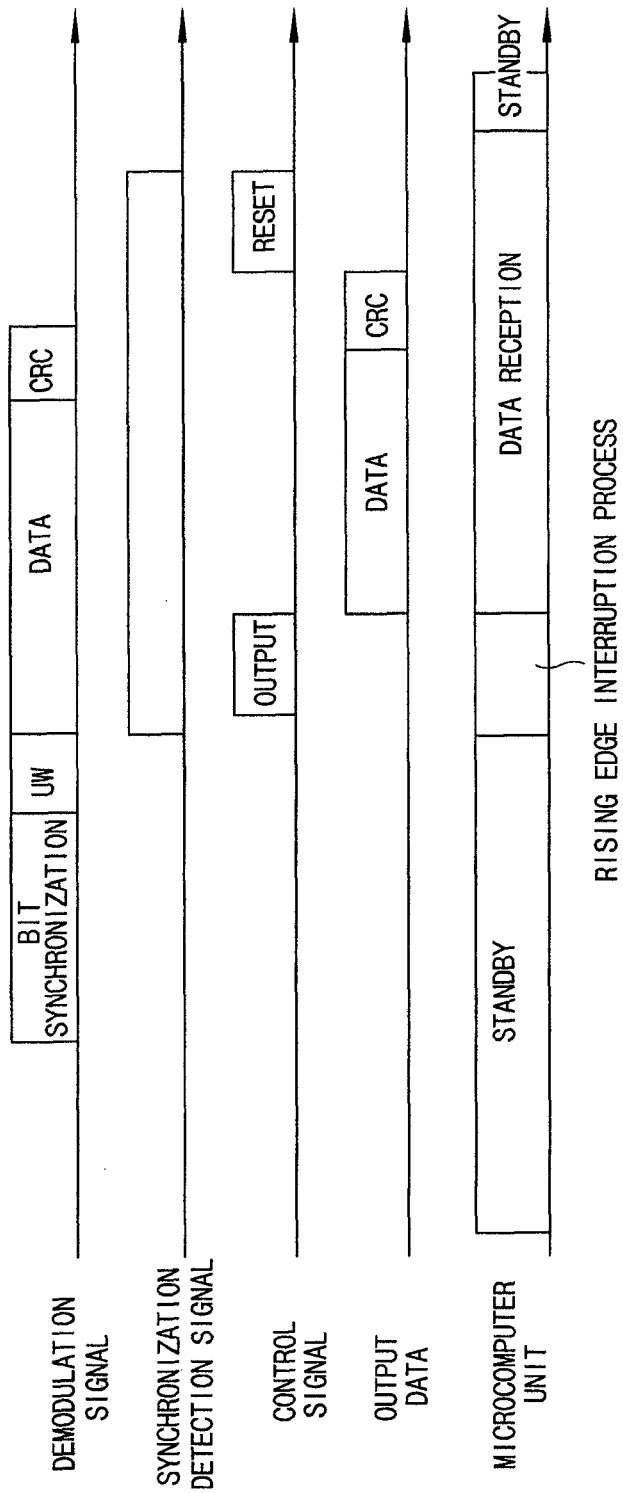
FIGS. 16 to 18 is time charts for explaining the operation of the conventional example.
Figure 17:
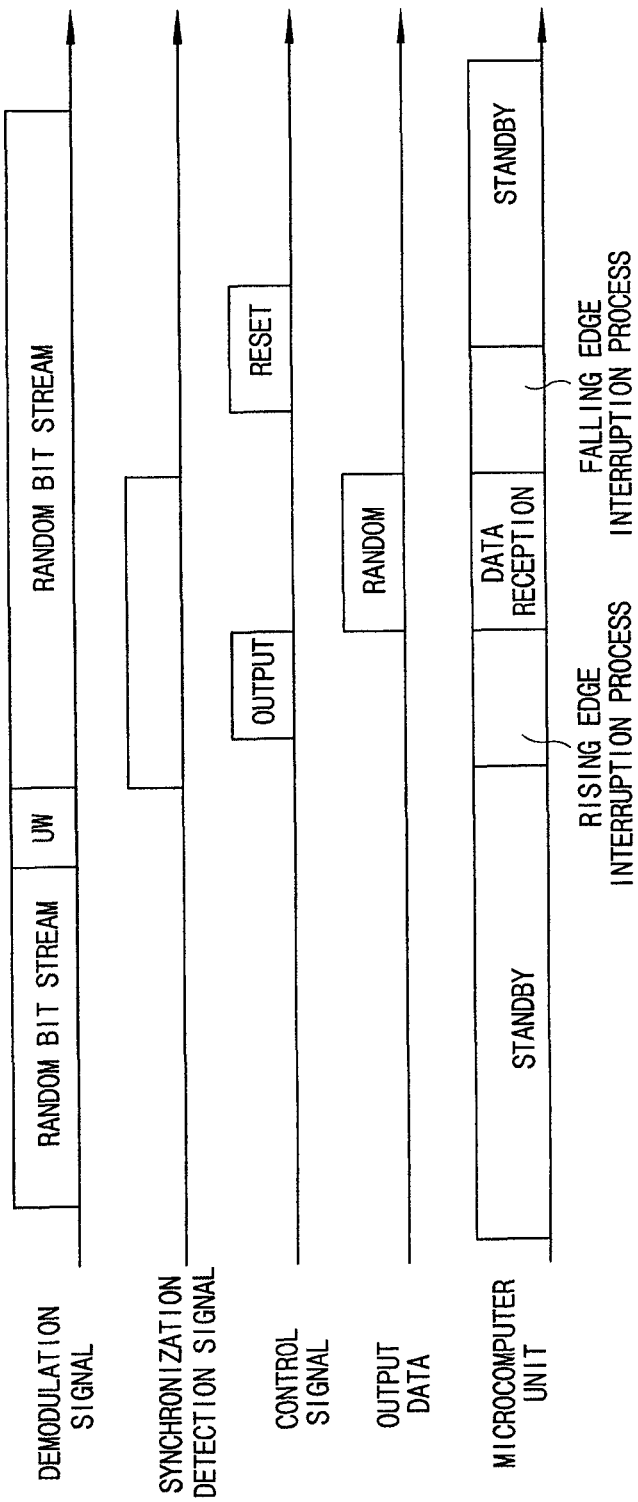

In the above embodiment, although the command decoding unit 290 performs logical-AND operation of the reception data output command and the frame synchronization detection signal and determines whether or not the reception data output command is outputted to the reception data buffer 250, the present invention is not limited thereto. That is, as shown in FIG. 14, an output of the frame synchronization detection signal may be checked (see time t=t3) immediately before a reception data output command is outputted based on the frame synchronization detection signal.

In this case, when outputting of the frame synchronization detection signal is stopped, the CPU 1000 may not output the reception data output command from the command decoding unit 290. Further, a dotted line of 'output' at the interval of t3 to t4 in FIG. 14 indicates that outputting of the reception data output command is stopped. By doing so, as shown in FIG. 14, the falling edge interruption process is not executed even though a falling interruption of the frame synchronization detection signal is received from the I/O unit 130, and the rising edge interruption process can be executed immediately after the rising of the frame synchronization detection signal. Thus, a maximum length of the reception data buffer 250 can be shortened in comparison to the configuration illustrated in FIG. 11.

While the invention has been shown and described with respect to the embodiments, it will be understood by those skilled in the art that various changes and modifications may be made without departing from the scope of the invention as defined in the following claims.

What is claimed is:
1. A wireless transmitter/receiver, comprising:
a local oscillator which oscillates at a predetermined local oscillation frequency;
a mixer for mixing a local oscillation signal having the local oscillation frequency outputted from an output terminal of the local oscillator and a radio signal received by an antenna;
a modulation circuit for modulating the local oscillation signal to generate a radio signal; and
a transmission/reception switching unit which selectively switches over between a reception state in which the output terminal of the local oscillator is connected to the mixer and a transmission state in which the output terminal is connected to the antenna without passing through the mixer,
wherein the local oscillator includes:
a reference oscillation unit which oscillates at a predetermined reference oscillation frequency lower than the local oscillation frequency;
a first frequency conversion unit and a second frequency conversion unit which convert a reference oscillation signal having the reference oscillation frequency outputted from an output terminal of the reference oscillation unit into the local oscillation signal;
a first switching unit which selectively switches over between a first input state in which the output terminal of the reference oscillation unit is connected to an input terminal of the first frequency conversion unit and a second input state in which the output terminal of the reference oscillation unit is connected to an input terminal of the second frequency conversion unit; and
a second switching unit which selectively switches over between a first output state in which the output terminal of the local oscillator is connected to the output terminal of the first frequency conversion unit and a second output state in which the output terminal of the local oscillator is connected to an output terminal of the second frequency conversion unit, while cooperating with switching operation of the first switching unit, and
wherein the second frequency conversion unit includes a voltage controlled oscillator, a phase comparator, a divider, a loop filter, a phase locked loop circuit having a charge pump, and the first frequency conversion unit includes a frequency multiplying circuit having power consumption smaller than that of the phase locked loop circuit.

2. The wireless transmitter/receiver of claim 1, wherein the reference oscillation unit selects and outputs one among multiple types of reference oscillation signals having different reference oscillation frequencies from each other.

3. The wireless transmitter/receiver of claim 1, wherein the local oscillator includes a bypass capacitor electrically connecting a power terminal of the voltage controlled oscillator with a ground with respect to an alternating current, the voltage controlled oscillator being connected to an external power source, and an opening/closing unit for switching over between connections of the bypass capacitor and the external power source or the power terminal, wherein, only when the first switching unit is switched to the second input state and the second switching unit is switched to the second output state, the opening/closing unit connects the bypass capacitor to the external power source or the power terminal.

4. The wireless transmitter/receiver of claim 3, wherein the local oscillator includes a current limiting resistor for limiting an inrush current flowing into the bypass capacitor from the external power source.

5. The wireless transmitter/receiver of claim 4, wherein the local oscillator further includes a short-circuit unit connected in parallel to the current limiting resistor, wherein the short-circuit unit connects the external power source to the power terminal after the opening/closing unit connects the bypass capacitor to the external power or the power terminal.

6. The wireless transmitter/receiver of claim 1, wherein the local oscillator selectively outputs a local oscillation signal having a receiving local oscillation frequency different from a radio frequency of the radio signal and a local oscillation signal having a transmitting local oscillation frequency equal to the radio frequency, and the local oscillation signal selected relatively frequently from among the local oscillation signal having the receiving local oscillation frequency and the local oscillation signal having the transmitting local oscillation frequency is outputted by the first frequency conversion unit and the local oscillation signal selected relatively less frequently is outputted by the second frequency conversion unit.

7. The wireless transmitter/receiver of claim 6, further comprising a controller for controlling the first switching unit and the second switching unit, and wherein, in case where the transmission/reception switching unit is switched to the reception state, the controller switches the first switching unit to the second input state and switches the second switching unit to the second output state only when a reception signal outputted from the mixer is not normally demodulated in a state in which the first switching unit is switched to the first input state and the second switching unit to the first output state by the controller.

8. The wireless transmitter/receiver of claim 7, wherein, after a predetermined period of time has passed in the reception state, the controller keeps states of the first and second switching units at the time point when the predetermined period of time has passed.

9. The wireless transmitter/receiver of claim 7, wherein, when the transmission/reception switching unit is switched to the reception state, the local oscillator performs an intermittent operation in which an operation period and a pause period are repeated at a predetermined interval, and the controller switches the first switching unit to the first input state and switches the second switching unit to the first output state when the operation period starts.

10. The wireless transmitter/receiver of claim 9, wherein, after the number of switching the first switching unit to the second input state and the second switching unit to the second output state exceeds a predetermined number of times, the controller switches the first switching unit to the second input state and switches the second switching unit to the second output state when the operation period starts.

11. The wireless transmitter/receiver of claim 7, wherein the reference oscillation unit selects and outputs one among multiple types of reference oscillation signals having different reference oscillation frequencies from each other, wherein the first frequency conversion unit includes a plurality of multiplying circuits having different multipliers from each other, and wherein, when the reception signal outputted from the mixer is not normally demodulated in a state in which the controller switches the first switching unit to the first input state and the second switching unit to the first output state, the controller sequentially changes combinations of the reference oscillation frequencies of the reference oscillation signals and the multipliers of the multiplying circuits without changing the local oscillation frequency; and, when the reception signal is not normally demodulated in every combination, the controller switches the first switching unit to the second input state and switches the second switching unit to the second output state.

12. The wireless transmitter/receiver of claim 7, wherein the controller includes a clock for counting time, and wherein the controller switches the first switching unit to the second input state and the second switching unit to the second output state during a time zone of daytime, and switches the first switching unit to the first input state and the second switching unit to the first output state during a time zone of nighttime.

13. A wireless communication system for transmitting and receiving a radio signal by a radio wave between multiple wireless stations, each of the wireless stations comprising:

a wireless transmission/reception unit which transmits and receives the radio signal;

a radio level measuring unit which measures a received signal strength of the radio signal received by the wireless transmission/reception unit;

a timer which outputs a start-up signal whenever a predetermined intermittent reception time is lapsed; and an operation controller which analyzes the reception signal received by the wireless transmission/reception unit to obtain information related to the wireless transmission/reception unit itself, wherein the wireless transmission/reception unit autonomously executes an operation of receiving the radio signal based on an operation command set by the operation controller, and the radio level measuring unit autonomously executes an operation of measuring the received signal strength of the radio signal received by the wireless transmission/reception unit based on an operation command set by the operation controller, wherein, when the operation controller in a sleep state is activated by the start-up signal from the timer, the operation controller sets an operation command in the wireless transmission/reception unit and the radio level measuring unit and the operation controller shifts to the sleep state until the measuring of the received signal strength by the radio level measuring is completed, and wherein, when the measurement result of the received signal strength by the radio level measuring unit is equal to or greater than a predetermined reference value, the wireless transmission/reception unit continuously performs a reception operation and the operation controller analyzes the reception signal; and, when the measurement result is smaller than the reference value, the wireless transmission/reception unit stops the reception operation.

14. The wireless communication system of claim 13, wherein the radio level measuring unit outputs a start-up signal to the operation controller when the measuring of the received signal strength based on the operation command is completed; and the operation controller compares the measurement result of the received signal strength by the radio level measuring unit and the reference value when the operation controller in the sleep state is activated by the start-up signal from the radio level measuring unit; and, when the measurement result is equal to or greater than the reference value, the operation controller controls the wireless transmission/reception unit to continue the reception operation and analyzes the reception signal, and, when the measurement result is smaller than the reference value, the operation controller stops the reception operation of the wireless transmission/reception unit.

15. The wireless communication system of claim 13, wherein the radio level measuring unit compares the measurement result of the received signal strength and the reference value, and when the measurement result is smaller than the reference value, the radio level measuring unit stops the reception operation of the wireless transmission/reception unit.

16. The wireless communication system of claim 15, wherein the radio level measuring unit outputs a start-up signal to the operation controller when the measurement result of the received signal strength is equal to or greater than the reference value, and, the operation controller analyzes a signal received by the wireless transmission/reception unit when the operation controller in the sleep state is activated by the start-up signal from the radio level measuring unit.

17. The wireless communication system of claim 13, wherein the wireless transmission/reception unit includes:
a local oscillator which oscillates at a predetermined local oscillation frequency;
a mixer for mixing a local oscillation signal having the local oscillation frequency outputted from an output terminal of the local oscillator and a radio signal received by an antenna;
a modulation circuit for modulating the local oscillation signal to generate a radio signal; and
a transmission/reception switching unit which selectively switches over between a reception state in which the output terminal of the local oscillator is connected to the mixer and a transmission state in which the output terminal is connected to the antenna without passing through the mixer, wherein the local oscillator includes:
a reference oscillation unit which oscillates at a predetermined reference oscillation frequency lower than the local oscillation frequency;
a first frequency conversion unit and a second frequency conversion unit which convert a reference oscillation signal having the reference oscillation frequency outputted from an output terminal of the reference oscillation unit into the local oscillation signal;
a first switching unit which selectively switches over between a first input state in which the output terminal of the reference oscillation unit is connected to an input terminal of the first frequency conversion unit and a second input state in which the output terminal of the reference oscillation unit is connected to an input terminal of the second frequency conversion unit; and
a second switching unit which selectively switches over between a first output state in which the output terminal of the local oscillator is connected to the output terminal of the first frequency conversion unit and a second output state in which the output terminal of the local oscillator is connected to an output terminal of the second frequency conversion unit, while cooperating with switching operation of the first switching unit, and wherein the second frequency conversion unit includes a voltage controlled oscillator, a phase comparator, a divider, a loop filter, a phase locked loop circuit having a charge pump, and the first frequency conversion unit includes a frequency multiplying circuit having power consumption smaller than that of the phase locked loop circuit.

* * * * *